United States Patent
Stroeh et al.

(10) Patent No.: US 10,311,413 B2
(45) Date of Patent: Jun. 4, 2019

(54) BY-ITEM BILL PAYMENTS

(71) Applicant: MasterCard International Incorporated, Purchase, NY (US)

(72) Inventors: Antonia Stroeh, Stamford, CT (US); John Doherty, Brooklyn, NY (US); Alexis Suberville, Brooklyn, NY (US); Holliday Haynes, Freeport, NY (US); Stephen Parento, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 877 days.

(21) Appl. No.: 14/789,503

(22) Filed: Jul. 1, 2015

(65) Prior Publication Data
US 2017/0004463 A1    Jan. 5, 2017

(51) Int. Cl.
*G06Q 20/10*    (2012.01)
*G06Q 30/04*    (2012.01)

(52) U.S. Cl.
CPC ........... *G06Q 20/102* (2013.01); *G06Q 30/04* (2013.01)

(58) Field of Classification Search
CPC ........ G06Q 10/00; G06Q 20/00; G06Q 30/00; G06Q 40/00
USPC ....................................................... 705/3-44
See application file for complete search history.

(56) References Cited

U.S. PATENT DOCUMENTS

| | | | |
|---|---|---|---|
| 5,699,528 A | 12/1997 | Hogan | |
| 5,943,656 A | 8/1999 | Crooks et al. | |
| 6,636,833 B1 | 10/2003 | Flitcroft et al. | |
| 6,757,371 B2 | 6/2004 | Kim et al. | |
| 7,136,835 B1 | 11/2006 | Flitcroft et al. | |
| 7,577,610 B2 | 8/2009 | Miyuki | |

(Continued)

FOREIGN PATENT DOCUMENTS

| | | |
|---|---|---|
| JP | 2002-183445 A | 6/2002 |
| JP | 2004-145397 A | 5/2004 |
| WO | 2013/122912 A1 | 8/2013 |

OTHER PUBLICATIONS

Authorized Officer Agnes Wittmann-Regis, WIPO, International Preliminary Report on Patentability, International Application No. PCT/US2016/038030, dated Jan. 2, 2018, pp. 1-5.

(Continued)

*Primary Examiner* — Frantzy Poinvil
(74) *Attorney, Agent, or Firm* — Otterstedt, Ellenbogen & Kammer, LLP

(57) ABSTRACT

A plurality of billers are enrolled in a by-item bill payment program. An invoice is obtained from a given one of said billers, including multiple charges corresponding to at least one of goods and services purchased from the given one of said billers by a first payor. The invoice is modified, based at least in part on said enrolling step, to generate at least one modified invoice including multiple charges corresponding to at least one of goods and services purchased from the given one of said billers by said first payor, the multiple charges being handled under different payment terms. The at least one modified invoice is sent to said first payor; payment from said first payor is obtained; and the obtained payment is allocated. A specific exemplary software architecture for implementing the method is also disclosed.

21 Claims, 12 Drawing Sheets

(56) References Cited

U.S. PATENT DOCUMENTS

| | | | | |
|---|---|---|---|---|
| 7,958,049 | B2* | 6/2011 | Jamison | G06Q 20/04 705/35 |
| 8,417,628 | B2* | 4/2013 | Poplawski | G06Q 20/04 705/39 |
| 8,533,079 | B2* | 9/2013 | Sharma | G06Q 20/02 705/34 |
| 8,595,134 | B2* | 11/2013 | Kelly | G06Q 20/14 705/39 |
| 8,630,949 | B2* | 1/2014 | McLaughlin | G06Q 20/10 705/30 |
| 8,688,552 | B1 | 4/2014 | Sahoo et al. | |
| 8,732,044 | B2 | 5/2014 | Lovelett et al. | |
| 8,744,965 | B2 | 6/2014 | Blanco et al. | |
| 8,751,384 | B2* | 6/2014 | Myklebust | G06Q 30/04 705/40 |
| 8,799,157 | B1* | 8/2014 | Weisman | G06Q 30/04 705/40 |
| 9,824,342 | B2* | 11/2017 | Kelly | G06Q 20/102 |
| 2001/0056390 | A1 | 12/2001 | Varadarajan et al. | |
| 2002/0123949 | A1 | 9/2002 | VanLeeuwen | |
| 2004/0015392 | A1 | 1/2004 | Hammel et al. | |
| 2004/0081302 | A1 | 4/2004 | Kim et al. | |
| 2005/0160035 | A1 | 7/2005 | Umamyo | |
| 2005/0177448 | A1 | 8/2005 | Fu et al. | |
| 2006/0089877 | A1 | 4/2006 | Graziano et al. | |
| 2006/0229984 | A1 | 10/2006 | Miyuki | |
| 2007/0233615 | A1 | 10/2007 | Tumminaro | |
| 2007/0244811 | A1 | 10/2007 | Tumminaro | |
| 2007/0255653 | A1 | 11/2007 | Tumminaro et al. | |
| 2007/0255662 | A1 | 11/2007 | Tumminaro | |
| 2008/0052176 | A1 | 2/2008 | Buchheit | |
| 2008/0275779 | A1 | 11/2008 | Lakshminarayanan | |
| 2008/0275811 | A1 | 11/2008 | Koningstein et al. | |
| 2009/0119171 | A1 | 5/2009 | Goff et al. | |
| 2009/0119190 | A1 | 5/2009 | Realini | |
| 2009/0171839 | A1 | 7/2009 | Rosano et al. | |
| 2009/0177497 | A1 | 7/2009 | Raksi et al. | |
| 2009/0288012 | A1 | 11/2009 | Hertel et al. | |
| 2010/0017324 | A1 | 1/2010 | Brownhill et al. | |
| 2010/0078472 | A1 | 4/2010 | Lin et al. | |
| 2010/0088207 | A1 | 4/2010 | McLaughlin et al. | |
| 2010/0100480 | A1 | 4/2010 | Altman et al. | |
| 2010/0121745 | A1 | 5/2010 | Teckchandani et al. | |
| 2010/0174644 | A1 | 7/2010 | Rosano et al. | |
| 2010/0205091 | A1 | 8/2010 | Graziano et al. | |
| 2011/0125643 | A1 | 5/2011 | Cameo et al. | |
| 2011/0166883 | A1 | 7/2011 | Palmer et al. | |
| 2011/0246342 | A1 | 10/2011 | Gibson et al. | |
| 2011/0251952 | A1 | 10/2011 | Kelly et al. | |
| 2012/0150706 | A1 | 6/2012 | Hashir | |
| 2012/0166332 | A1 | 6/2012 | Naaman | |
| 2012/0197788 | A1 | 8/2012 | Sanghvi et al. | |
| 2012/0259688 | A1 | 10/2012 | Kim | |
| 2012/0259779 | A1 | 10/2012 | Bharghavan et al. | |
| 2013/0013506 | A1 | 1/2013 | Wiggins et al. | |
| 2013/0132244 | A1 | 5/2013 | Jenkins et al. | |
| 2013/0227353 | A1 | 8/2013 | Dash et al. | |
| 2013/0290177 | A1 | 10/2013 | Milam et al. | |
| 2013/0297486 | A1 | 11/2013 | Colborn | |
| 2013/0311362 | A1 | 11/2013 | Milam et al. | |
| 2013/0346302 | A1 | 12/2013 | Purves et al. | |
| 2014/0070001 | A1 | 3/2014 | Sanchez et al. | |
| 2014/0081854 | A1 | 3/2014 | Sanchez et al. | |
| 2014/0114842 | A1 | 4/2014 | Blackhurst et al. | |
| 2014/0180929 | A1 | 6/2014 | Ohnishi et al. | |
| 2014/0244477 | A1 | 8/2014 | Kolathur | |
| 2014/0279098 | A1 | 11/2014 | Ham | |
| 2014/0351118 | A1 | 11/2014 | Zhao | |
| 2015/0142657 | A1 | 5/2015 | Sagastiverza et al. | |
| 2015/0220904 | A1 | 8/2015 | Gibson et al. | |
| 2015/0364017 | A1 | 12/2015 | Hall et al. | |
| 2016/0071094 | A1 | 3/2016 | Krishnaiah et al. | |
| 2016/0005037 | A1 | 7/2016 | Eilertsen | |
| 2016/0253731 | A1 | 9/2016 | Ketchel, III et al. | |
| 2017/0004467 | A1 | 1/2017 | Stroeh | |
| 2017/0004468 | A1 | 1/2017 | Stroeh | |
| 2017/0004498 | A1 | 1/2017 | Stroeh | |
| 2017/0255908 | A1 | 9/2017 | Joubert et al. | |

OTHER PUBLICATIONS

Authorized Officer Norihiko Shiota, Japan Patent Office, International Search Report, International Application No. PCT/US2016/038030, dated Aug. 30, 2016, pp. 1-2.

Authorized Officer Norihiko Shiota, Japan Patent Office, Written Opinion of the ISA, International Application No. PCT/US2016/038030, dated Aug. 30, 2016, pp. 1-4.

Authorized Officer Yuko Sato, Japan Patent Office, International Search Report, International Application No. PCT/US2016/038026, dated Sep. 27, 2016, pp. 1-2.

Authorized Officer Yuko Sato, Japan Patent Office, Written Opinion of the ISA, International Application No. PCT/US2016/038026, dated Sep. 27, 2016, pp. 1-3.

Authorized Officer Agnes Wittmann-Regis, WIPO, International Search Report, International Application No. PCT/US2016/038026, dated Jan. 2, 2018, pp. 1-4.

Authorized Officer Agnes Wittmann-Regis, WIPO, International Search Report, International Application No. PCT/US2016/038024, dated Jan. 2, 2018, pp. 1-5.

Authorized Officer Satohide Tanigawa, Japan Patent Office, International Search Report, International Application No. PCT/US2016/038024, dated Aug. 30, 2016, pp. 1-2.

Authorized Officer Satohide Tanigawa, Japan Patent Office, Written Opinion of the ISA, International Application No. PCT/US2016/038024, dated Aug. 30, 2016, pp. 1-4.

Credit Card Overdraft Protection—Wells Fargo, p. 1, Downloaded Sep. 3, 2014 from https://www.wellsfargo.com/credit-cards/cash-back-college-card/overdra . . . .

Enterprise service bus—Wikipedia, p. 1-6, Downloaded Dec. 11, 2014 From http://en.wikipedia.org/wiki/Enterprise_service_bus.

MasterCard's Global Clearing Management System, p. 1-12, Downloaded Nov. 13, 2014 from http://blog.unibulmerchantservices.com/mastercards-global-clearing-ma . . . .

What You Need to Know About Credit Card Insurance Plans—ABC News, p. 1-4, Downloaded Sep. 3, 2014 from http://abcnews.go.com/Business/credit-card-insurance-plans/story?id=1 . . . .

Using credit card for overdraft protection, p. 1-5, Downloaded Sep. 3, 2014 from http://www.bankrate.com/brm/news/cc/20061128_overdraft_protection_ . . . .

Select Credit for Overdraft Protection | HSBC, p. 1, Downloaded Sep. 3, 2014 From http://www.us.hsbc.com/1/2/home/personal-banking/select-credit-overdra . . . .

M2 Presswire, "wagamama and MasterCard Launch Okrl with MasterPass for Customers," Mar. 3, 2015, pp. 1-2.

* cited by examiner

BY-ITEM BILL PAYMENTS

FIELD OF THE DISCLOSURE

The present disclosure relates generally to the electronic and computer arts, and, more particularly, to electronic bill payment systems and the like.

BACKGROUND OF THE DISCLOSURE

The use of payment cards, such as credit cards, debit cards, and pre-paid cards, has become ubiquitous. Most payment card accounts have one or more associated physical cards; however, the use of non-traditional payment devices, such as appropriately-configured "smart" cellular telephones, is increasing. In some instances, a card or non-traditional payment device is presented at a brick-and-mortar location. In card-not-present transactions, the card or non-traditional payment device is not physically present at the merchant. One example of a card-not-present transaction is Internet shopping. Another example is card-not-present recurring payments, wherein a card holder provides a merchant with the payment card account number and related information (e.g., expiration date) and the merchant uses this information to initiate recurring (e.g., monthly) transactions.

The process of electronic bill presentment and payment has also been popular for quite some time. For example, U.S. Pat. No. 5,699,528 to Hogan (expressly incorporated herein by reference in its entirety for all purposes) discloses a system and method for bill delivery and payment over a communications network. In the bill delivery and payment system, users are able to access a server computer on a communications network to obtain bill information and pay bills.

SUMMARY OF THE DISCLOSURE

Principles of the disclosure provide techniques for by-item bill payments.

In one aspect, an exemplary method includes: enrolling a plurality of billers in a by-item bill payment program, via a by-item bill payment platform module executing on at least one hardware processor; obtaining an invoice from a given one of said billers via a bill presentment and payment system platform module executing on said at least one hardware processor, said bill presentment and payment system platform module being in data communication with said by-item bill payment platform module, the invoice including multiple charges corresponding to at least one of goods and services purchased from the given one of said billers by a first payor; modifying the invoice obtained from the given one of said billers, based at least in part on said enrolling step, via said by-item bill payment platform module executing on said at least one hardware processor, to generate at least one modified invoice including multiple charges corresponding to at least one of goods and services purchased from the given one of said billers by said first payor, at least a first one of the charges being handled under first payment terms and at least a second one of the charges being handled under second payment terms, the first and second payment terms being different relative to one another; sending said at least one modified invoice to said first payor, via said bill presentment and payment system platform module executing on said at least one hardware processor; obtaining payment from said first payor, via said bill presentment and payment system platform module executing on said at least one hardware processor; and allocating a first portion of the obtained payment towards said first one of the charges and allocating a second portion of the obtained payment to said second one of the charges, via said bill presentment and payment system platform module executing on said at least one hardware processor.

In another aspect, an exemplary apparatus includes a memory; at least one processor operatively coupled to said memory; and a persistent storage device operatively coupled to said memory and storing in a non-transitory manner instructions which, when loaded into said memory, cause said at least one processor to be configured to implement any one, some, or all of the disclosed method steps.

Aspects of the disclosure contemplate the method(s) performed by one or more entities herein, as well as facilitating one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the disclosure or elements thereof can be implemented in the form of a computer program product including a tangible computer readable recordable storage medium with computer usable program code for performing the method steps indicated stored thereon in a non-transitory manner. Furthermore, one or more embodiments of the disclosure or elements thereof can be implemented in the form of a system (or apparatus) including a memory and at least one processor that is coupled to the memory and operative to perform exemplary method steps. Yet further, in another aspect, one or more embodiments of the disclosure or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the disclosure can provide substantial beneficial technical effects; for example:
  allowing billers to offer different payment terms options to incentivize the purchase of certain goods or services, without modification of the billers' core systems;
  providing a coordinated mechanism enabling billers to ascribe different payment terms to individual items on the same invoice;
  providing payors with the benefit by having additional payment terms options for certain items on an invoice.

These and other features and advantages of the present disclosure will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 7 is a block diagram conceptually depicting an illustrative process for making electronic funds transfers (EFT) for bill payment or the like;

It is to be appreciated that the drawings described herein are presented for illustrative purposes only. Moreover, common but well-understood elements and/or features that may be useful or necessary in a commercially feasible embodiment may not be shown in order to facilitate a less hindered view of the illustrated embodiments.

DETAILED DESCRIPTION OF PREFERRED EMBODIMENTS

Embodiments of the disclosure will be described herein in the context of an illustrative by-item bill payment system for use, for example, in connection with an electronic bill presentment and payment system (BPPS) or the like (the aforementioned MASTERCARD Remote Payment and Presentation Service (RPPS®) electronic bill presentment and payment system is a non-limiting example), configured for enabling a biller to individually assign different payment terms to different subsets of items on an invoice. It should be understood, however, that embodiments of the disclosure are not limited to this or any other particular system arrangement or application. Rather, it will become apparent to those skilled in the art given the teachings herein that numerous modifications can be made to the illustrative embodiments shown that are within the scope of the claimed disclosure. That is, no limitations with respect to the embodiments shown and described herein are intended or should be inferred.

As a preliminary matter, for purposes of clarifying and describing embodiments of the disclosure, the following table provides a summary of certain acronyms and their corresponding definitions, as the terms are used herein:

Table of Acronym Definitions

| Acronym | Definition |
| --- | --- |
| BPPS | Bill presentment and payment system |
| RPPS | Remote Payment and Presentation Service |
| EFT | Electronic funds transfer |
| IC | Integrated circuit |
| PDA | Personal digital assistant |
| PAN | Primary account number |
| PIN | Personal identification number |
| ROM | Read-only memory |
| AID | Application identifier |
| EEPROM | Electrically erasable programmable read-only memory |
| RFID | Radio frequency identification |
| VPN | Virtual private network |
| LAN | Local area network |
| UPC | Universal product code |
| ISO | International Organization for Standardization |
| NFC | Near field communications |
| BBPN | By-item bill payment network |
| API | Application program interface |
| DBMS | Database management system |
| UI | User interface |
| OFDI | Originating depository financial institution |
| ACH | Automated clearing house |

Payment Devices and Associated Payment Processing Networks

Figure 1:
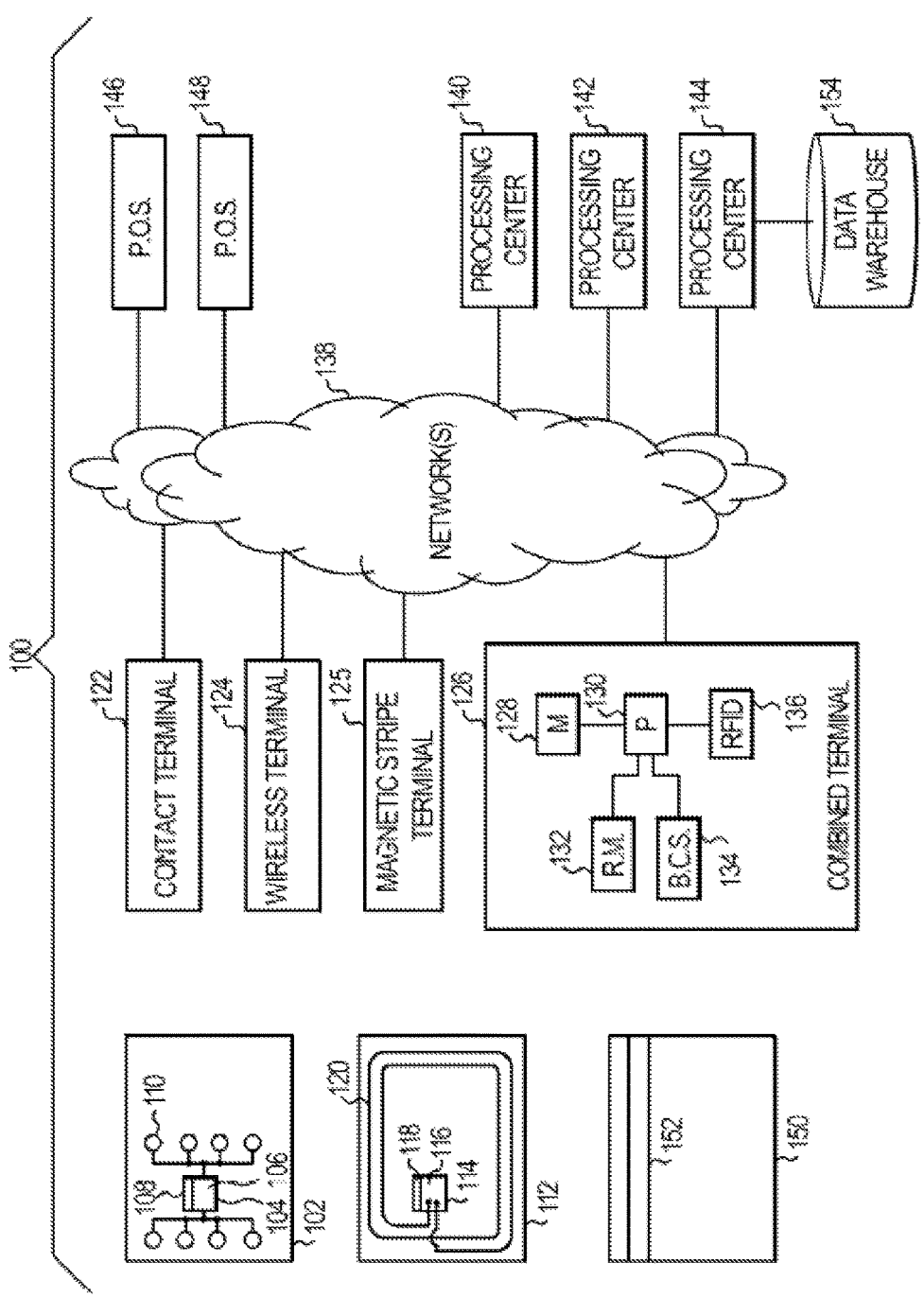
FIG. 1 shows an example of a system and various components thereof that can be useful to implement techniques of the disclosure.

Attention should now be given to FIG. 1, which depicts an exemplary embodiment of a system 100, useful in connection with some aspects of the disclosure, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency electromagnetic waves. An oscillator or oscillators, and/or additional appropriate circuitry for one or more of modulation, demodulation, down-conversion, and the like can be provided. Note that cards 102, 112 are exemplary of a variety of devices that can be employed. The system 100 per se may function with other types of devices in lieu of or in addition to "smart" or "chip" cards 102, 112; for example, a conventional magnetic stripe device 150, such as a card having a magnetic stripe 152. Furthermore, an appropriately configured mobile device (e.g., "smart" cellular telephone handset, tablet, personal digital assistant (PDA), and the like) can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well-known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number (PAN) and/or personal identification number (PIN). The memory portions of units 108, 118 can store the operating system of the cards 102, 112. The operating system loads and executes applications and provides file management or other basic card services to the applications. One operating system that can be used to implement some aspects or embodiments of the present disclosure is the MULTOS® operating system licensed by MAOSCO Limited (MAOSCO Limited, St. Andrews House, The Links, Kelvin Close, Birchwood, Warrington, WA3 7PB, United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory (ROM) within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

The skilled artisan will also be familiar with the Master-Card® PayPass™ specifications, available under license from MasterCard International Incorporated of Purchase, N.Y., USA (trademarks of MasterCard International Incorporated of Purchase, N.Y., USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically-erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards, e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN), such as is described with respect to FIGS. 2 and 9-13 below). More than one network could be employed to connect different elements of the system. For example, a local area network (LAN) could connect a terminal to a local server or other computer at a retail establishment or the like. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone, tablet, or the like.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as reader module 132 that is coupled to the processor and configured to interface with the portable apparatuses 102, 112, 150. The processor 130 can be operable to communicate with portable payment devices of a user via the reader module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as product identification from a universal product code (UPC) or RFID tag on a product to be purchased.

The above-described devices 102, 112 can be International Organization for Standardization (ISO) 7816-compliant contact cards or devices or NFC (Near Field Communications) or ISO 14443-compliant proximity cards or devices. In operation, card 112 can be touched or tapped on the wireless terminal 124 or reader module 132 (or an associated reader), which then contactlessly transmits the electronic data to the proximity IC chip in the card 112 or other wireless device.

One or more of the processing centers 140, 142, 144 can include a database such as a data warehouse 154.

It should be noted that the system depicted in FIG. 1 may involve not only conventional transactions at "brick and mortar" merchants, but also card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction.

In some cases, there can be payment card accounts that do not have physical cards or other physical payment devices associated therewith; for example, a customer can be provided with a PAN, expiration date, and security code, but no physical payment device, and use same, for example, for card-not-present telephone or Internet transactions. In this regard, a "cardholder" should be understood to refer to the account holder of a payment card account, regardless of whether the holder actually has a physical payment card or other physical payment device.

Figure 2:
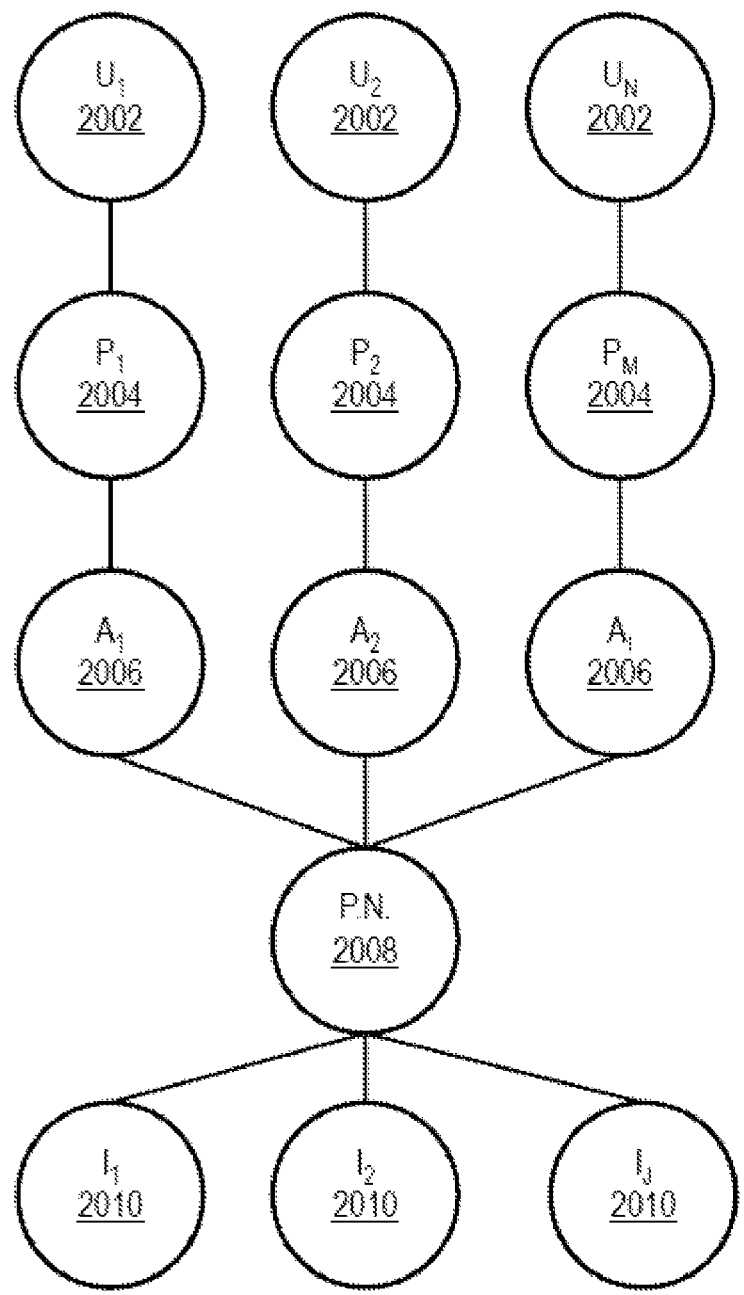
FIG. 2 depicts an exemplary inter-relationship between and among (i) a payment network configured to facilitate transactions between multiple issuers and multiple acquirers, (ii) a plurality of users, (iii) a plurality of merchants, (iv) a plurality of acquirers, and (v) a plurality of issuers, useful in connection with one or more embodiments of the disclosure.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator of a payment network 2008 configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal. Note, also, that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the consumer 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the payment network 2008, which debits the issuers 2010 for payment and credits the acquirer 2006. Once the acquirer 2006 has been paid, the acquirer 2006 pays the merchant 2004.

It will be appreciated that the payment network 2008 shown in FIG. 2 is an example of a payment network configured to facilitate transactions between multiple issuers and multiple acquirers, which may be thought of as an "open" system. Some embodiments of the disclosure may be employed with other kinds of payment networks, for example, proprietary or closed payments networks with only a single issuer and acquirer. Furthermore in this regard, FIG. 2 depicts a four-party model, as will be known to the skilled artisan; the four parties are the consumer 2002, merchant 2004, acquirer 2006, and issuer 2010. However, at least some embodiments are also of use with three-party models, wherein the acquirer and issuer are the same entity. In accordance with one or more embodiments, payors are able to use any payment method available in connection with a bill presentment and payment service (BPPS), including, for example, ACH or other electronic funds transfer; payment card accounts such as branded from MASTERCARD, VISA, American Express® (a registered trademark and/or service mark of American Express Company) or others, PayPal® (a registered trademark and/or service mark of PayPal, Inc.), and the like.

Messages within a network such as network 138 and/or network 2008, may, in at least some instances, conform to the ISO Standard 8583, Financial transaction card originated messages—Interchange message specifications, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)
ISO 8583:1993 (1993)
ISO 8583:1987 (1987)

As used herein, a "payment card network" is a communications network that uses payment card account numbers, such as PANs, to authorize, and to facilitate clearing and settlement of payment card transactions such as for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing card accounts to which a payment card account number is assigned, used for making purchases for the organization, but there is no corresponding physical card. In other instances, "virtual" account numbers are employed; this is also known as PAN mapping. The PAN mapping process involves taking the original PAN (which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of MasterCard International Incorporated of Purchase, N.Y., USA); by way of example and not limitation, techniques of U.S. Pat. Nos. 6,636,833 and 7,136,835 of Flitcroft et al., the complete disclosures of both of which are expressly incorporated herein by reference in their entireties for all purposes.

Some payment card networks connect multiple issuers with multiple acquirers; others use a three-party model. Some payment card networks use ISO 8583 messaging. Non-limiting examples of payment card networks that connect multiple issuers with multiple acquirers are the BANKNET® network and the VISANET® network. One or more embodiments can permit payment by many other different kinds of payment card networks as well; the AMERICAN EXPRESS® and DISCOVER® networks are non-limiting examples.

Figure 9:
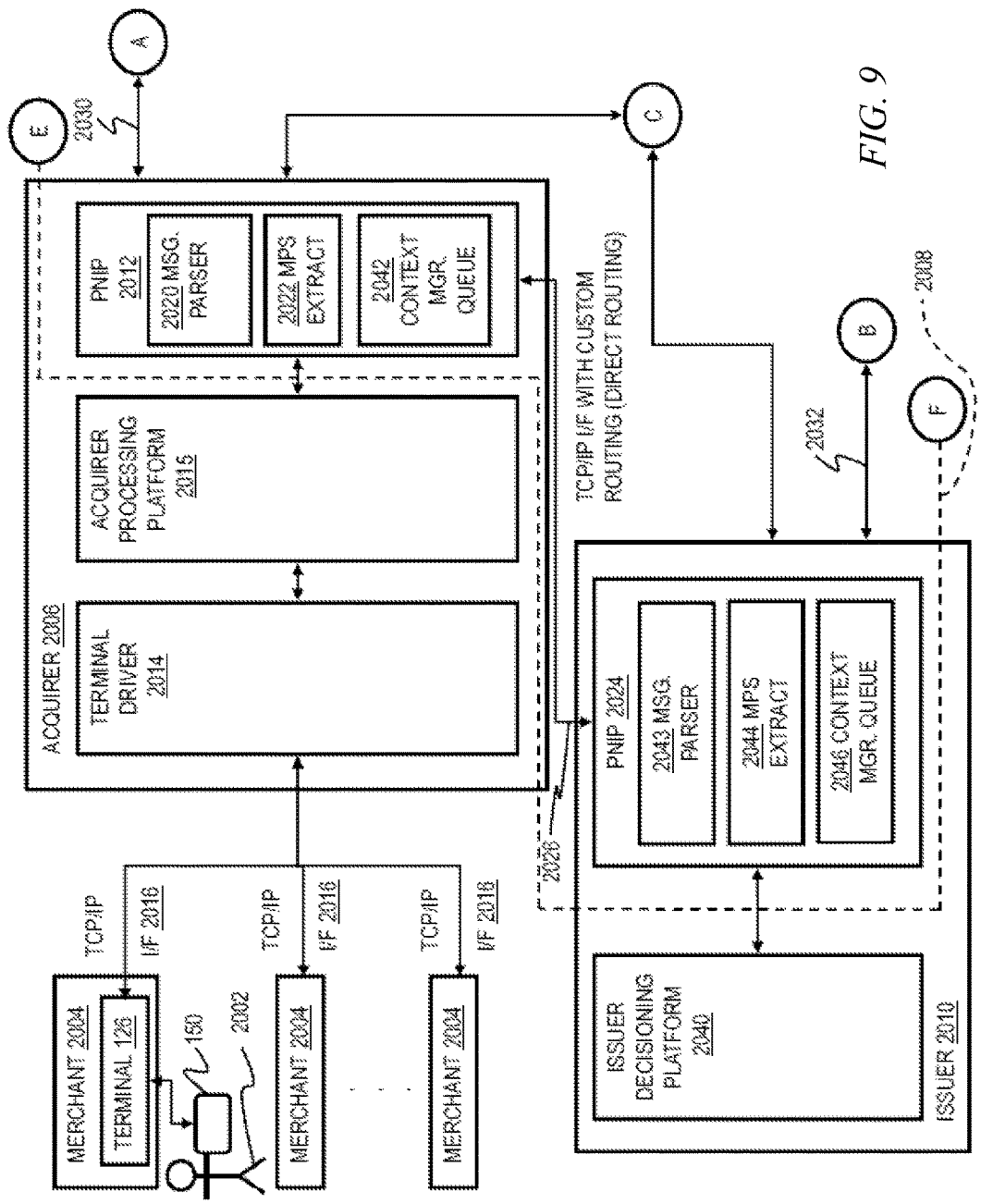
FIGS. 9 and 10 provide an exemplary detailed view of operation of an exemplary payment card network, in accordance with an aspect of the disclosure.
Figure 10:
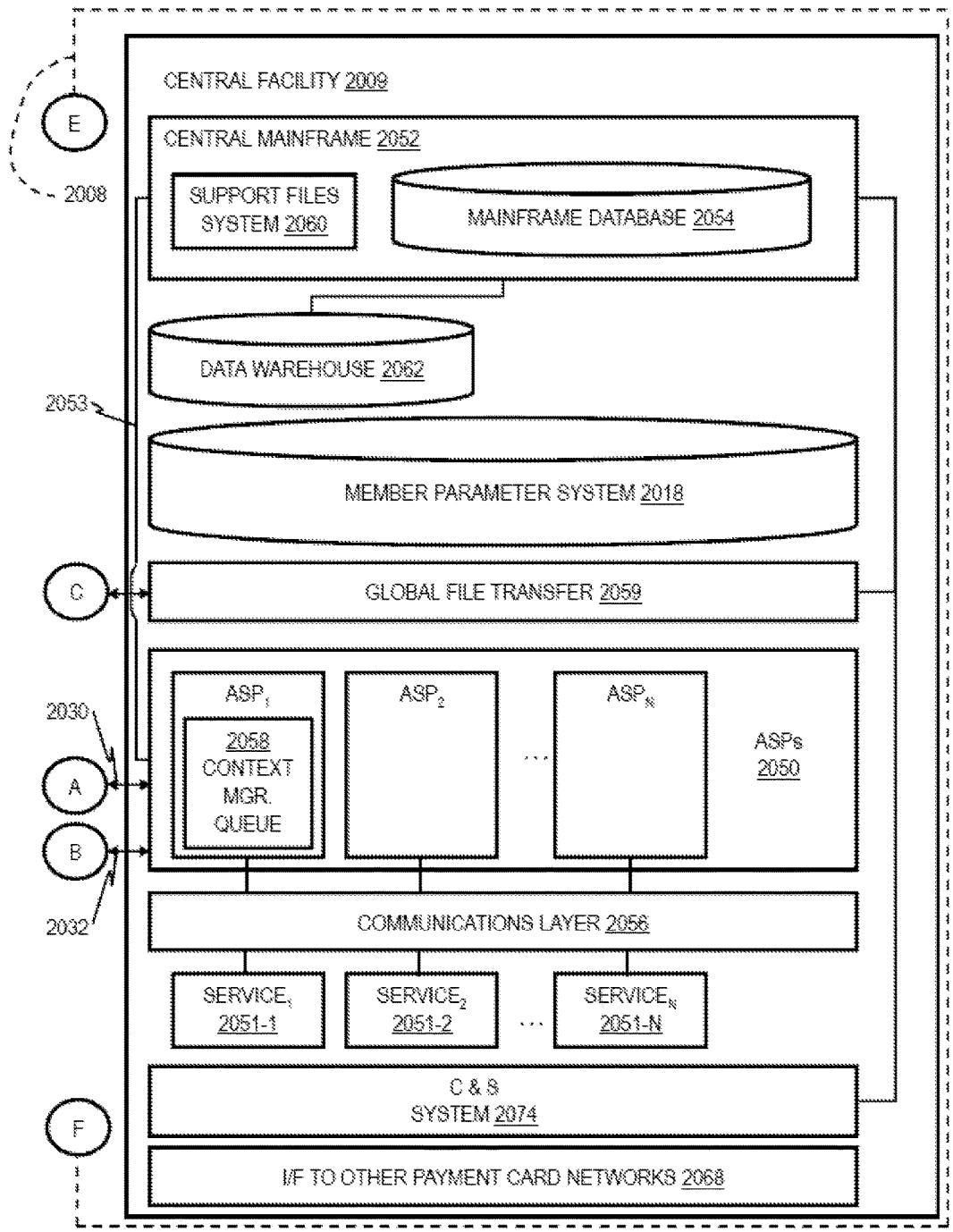

Still referring to FIG. 2, and with reference also now to FIGS. 9 and 10, by way of review and provision of additional detail, a consumer 2002 effectively presents his or her card 150 or other payment device (e.g., presents suitably configured "smart" phone or uses an e-wallet) to the terminal 126 of a merchant 2004. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information, or sends a "snail" mail with payment card account information to a hospital or other inpatient treatment facility). The merchant terminal 126 captures the card account information (by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 9 and 10 encompasses the network 2008. Note generally that points A, B, C, E, and F in FIG. 9 connect to the corresponding points in FIG. 10; the entire network and associated environment are not amenable to illustration on a single sheet.

More specifically, the acquirer 2006, in the more specific example of FIGS. 9 and 10, has at its premises a payment network interface processor (PNIP 2012). The MasterCard Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on their premises. Each acquirer 2006 will have a relationship with one or more merchants 2004 and will interface with the merchants' terminals 126 via terminal driver 2014 (an acquirer may also act as an acquirer for themselves as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format. The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. A centralized member parameter system (MPS) 2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six digit identification assigned by MasterCard for use by a member to uniquely identify activity the member is responsible for. A BIN or Bank Identification Number is a unique series of numbers assigned by MasterCard to a principal member and used as the first six digits of a cardholder account number. Other payment card networks have similar types of numbers, as will be apparent to the skilled artisan.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 configuration and transactions from that account range are then routed to the port from which the sign-in request is received. A member ID can be present on ports on multiple PNIPs at an Issuer site—see discussion of FIG. 12 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. On the other hand, if no special services are required, the message may be routed directly to the issuer PNIP 2024 as seen at 2026.

Messages routed directly to the issuer PNIP: In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050, and ASPs 2050 and issuer PNIP 2024 are referred to as a network interface onto the payment card network itself. In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figure 11:
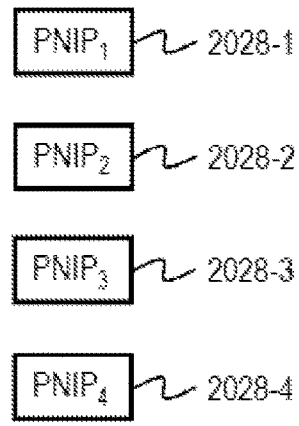
FIG. 11 shows a group of payment network interface processors, such as may be used with the network of FIGS. 9 and 10.
Figure 12:
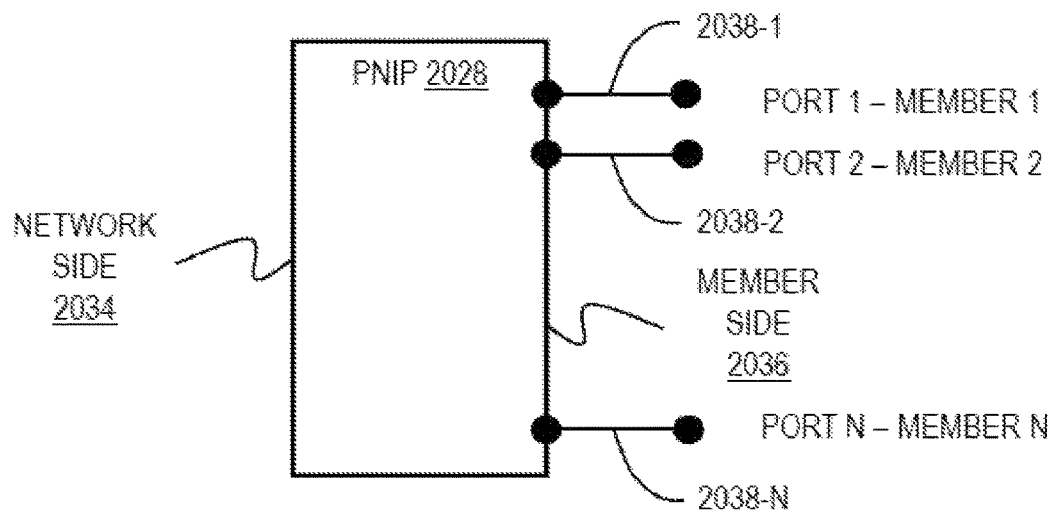
FIG. 12 shows a port arrangement on a payment network interface processor, such as may be used with the network of FIGS. 9 and 10.

FIG. 11 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 11 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 12 where a generalized PNIP 2028 has a network side 2034 and a member side 2036. Member side 2036 has N ports 2038-1 through 2038-N to members 1 to N. N is used herein as a generalized arbitrary integer and the value of N in FIG. 12 is not necessarily the same as that of N in connection with elements 2002 in FIG. 2, for example.

Figure 13:
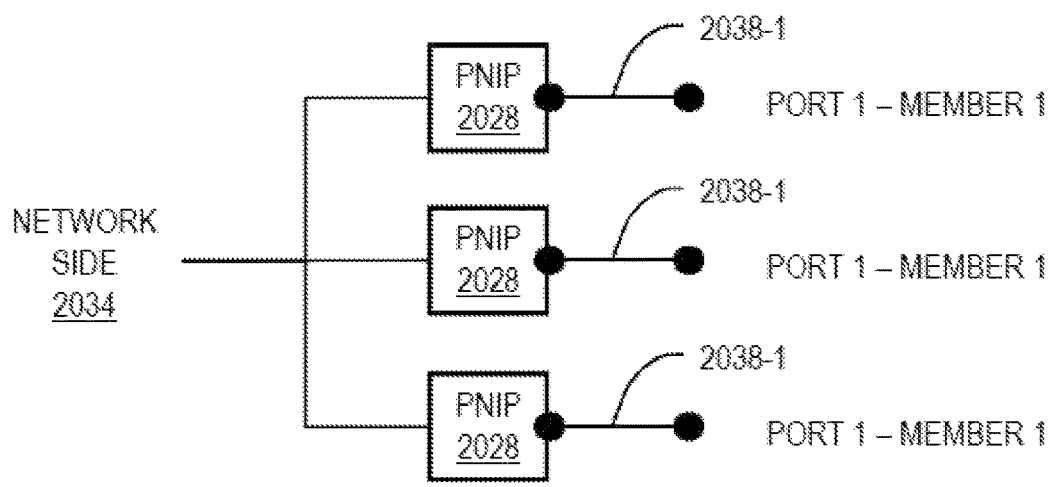
FIG. 13 shows an illustrative case wherein an issuer has multiple payment network interface processors.

As seen in FIG. 13, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 12). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 9 and 10 show "MPS extract" 2022, 2044; this will typically include the extract itself and the associated parameter file manager which manages obtaining the extracts from MPS 2018. Similarly, to reduce clutter, FIGS. 9 and 10 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 9 and 10 to avoid clutter.

Messages in case of Enhanced Services: In one or more instances, a special architecture is used to facilitate delivery of enhanced services (the ASP 2050 in FIG. 10 is a non-limiting example). Examples of enhanced services include the MASTERCARD IN CONTROL product providing spending controls and/or virtual card numbers (MASTERCARD IN CONTROL is generally representative of spend control systems, card control systems, and the like, and embodiments indicated as employing MASTERCARD IN CONTROL are not intended to imply any limitation to one particular spend control and/or card control system). Other examples of enhanced services are loyalty rewards, recurring payment cancellations, and the like. One or more instances do not deploy this complex logic out to the network edge. Furthermore in this regard, the issuer and acquirer PNIPs 2012, 2024 are referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transactions is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, MASTERCARD IN CONTROL, rewards, and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the MASTERCARD IN CONTROL service can be accessed via an instance of an Enterprise Service Bus.

Entry of Data into the Data Warehouse: In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse. Data warehouse 2062 should be distinguished from a data warehouse 154 that might be maintained by an issuer.

Clearing and Settlement: One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, the auth request and auth request response are in real time, and the clearing and settlement are in a batch mode.

By way of review and provision of additional detail, in at least some instances, in a batch mode, clearing is initiated via an ISO 8583 MTI 1240 message having a DE24 function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic aspects: Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, Mass. US) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks.

Electronic Bill Presentment and/or Payment Systems

Electronic bill presentment and payment systems are conceptually different than payment card networks, and will often use electronic funds transfer from a demand deposit account. In some instances, a single entity, such as MasterCard International Incorporated (a non-limiting example) will operate both a payment card network and an electronic bill presentment and payment system.

With regard to electronic bill presentment and payment systems, inventive techniques can be employed in a number of different environments. In one or more embodiments, inventive techniques can be employed in connection with the MASTERCARD RPPS® electronic payment system of MasterCard International Incorporated of Purchase, N.Y., USA. This example is non-limiting; for example, other types of electronic bill presentment and/or payment systems could be employed in other instances. Non-limiting examples are described in:

US Patent Publication 2011-0251952 A1 of Mary L. Kelly et al.

US Patent Publication 2012-0197788 A1 of Hemal Sanghvi et al.

US Patent Publication 2013-0290177 A1 of Amy Christine Milam and Stephen Joseph Klaus.

US Patent Publication 2013-0311362 A1 of Amy C. Milam et al.

The above-listed Kelly et al., Sanghvi et al., Milam/Klaus, and Milam et al. publications are hereby expressly incorporated by reference herein in their entireties for all purposes.

For the avoidance of doubt, references to MasterCard, unless expressly stated to be limited to MasterCard, are intended to be exemplary of an operator of an electronic BPPS and/or an operator of a payment card network, as will be appreciated from the context, whether or not qualified by words such as "or other operator."

Furthermore, another non-limiting example of an electronic BPPS with which one or more embodiments of the disclosure can be employed is the CHECKFREE® platform available from Fiserv, Inc. of Brookfield, Wis., USA.

Figure 6:
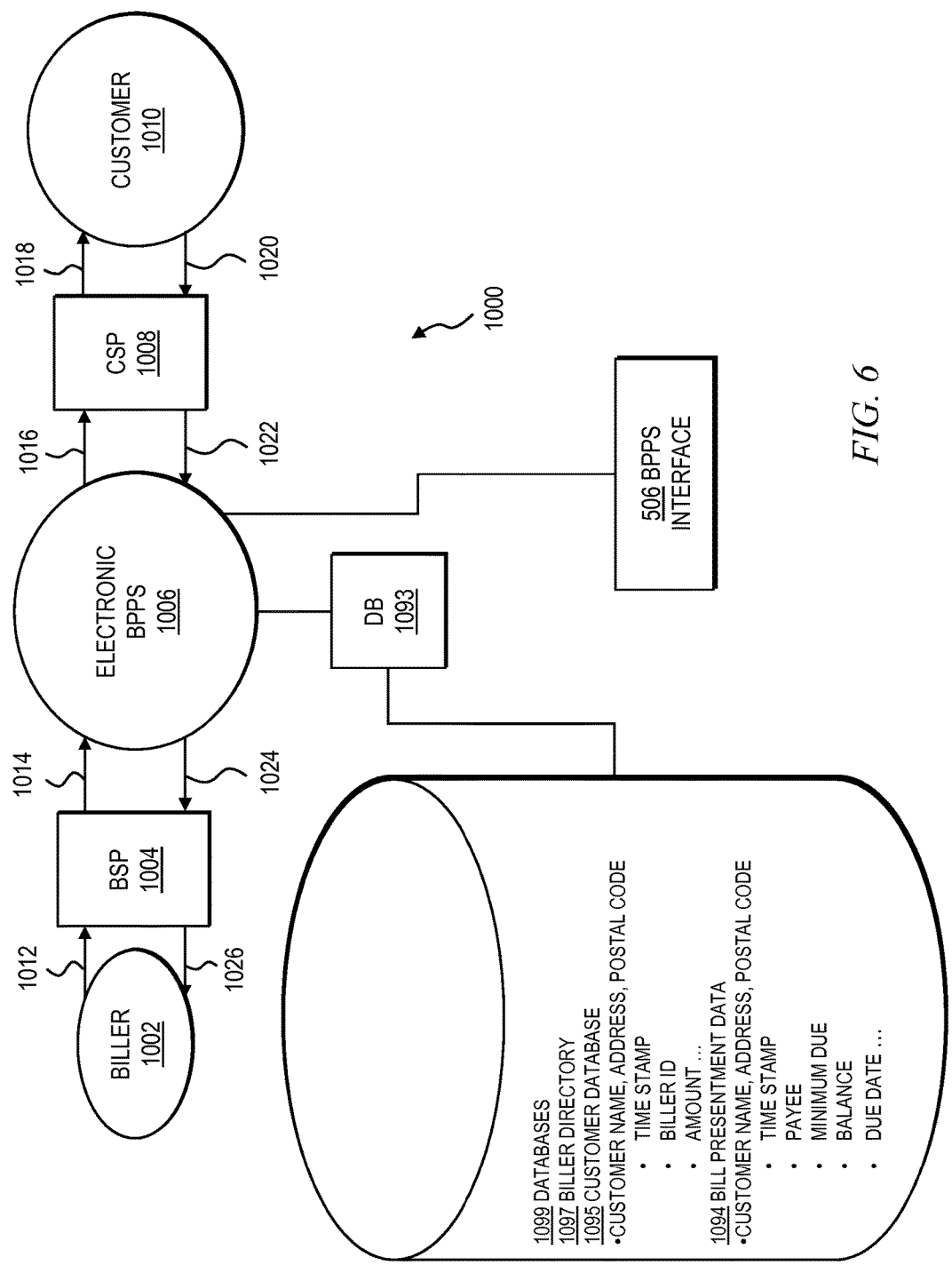
FIG. 6 is a block diagram depicting operation of at least a portion of an illustrative electronic bill presentment and payment system (BPPS), such as the MASTERCARD Remote Payment and Presentation Service (RPPS®) electronic bill presentment and payment system, which is one non-limiting example of such a system, that is suitable for use in conjunction with aspects of the disclosure.
Figure 7:
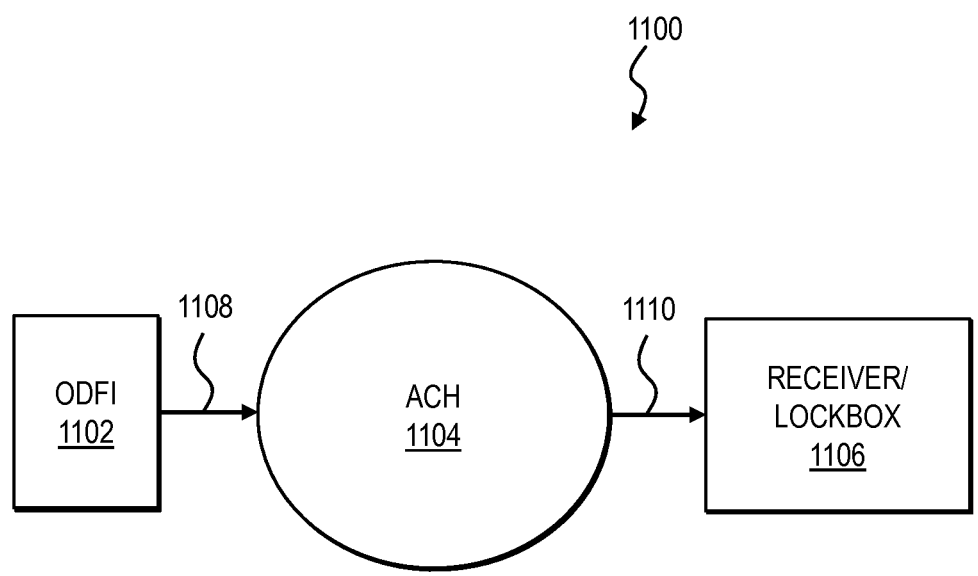

FIG. 6 shows operation of an electronic BPPS, such as the MASTERCARD RPPS® electronic bill presentment and payment system, which is but one non-limiting example of such a system, modified in accordance with aspects of the disclosure. Given the teachings herein, the skilled artisan will be able to implement one or more embodiments of the disclosure using a variety of techniques; by way of example and not limitation, the modification or supplementing of an existing MASTERCARD RPPS® system or other electronic BPPS as shown in FIG. 6 and/or an ACH or other EFT network as shown in FIG. 7. As shown in FIG. 6, in an approach 1000, during a presentment phase, a biller 1002 electronically sends billing information 1012 to its biller service provider (BSP) 1004; that is, an institution that acts as an intermediary between the biller and the consumer for the exchange of electronic bill payment information. BSP 1004 in turn sends the information to the electronic BPPS 1006, as seen at 1014. As seen at 1016, the system 1006 in turn delivers the billing information to the customer service provider (CSP) 1008, that is, an agent of the customer that provides an interface directly to customers, businesses, or others for bill payment and presentment. The CSP enrolls customers in the BPPS per se, enables payment and presentment, and provides customer care. CSP 1008 presents the bill to the consumer (customer) 1010 at 1018.

In a payment phase, consumer 1010 sends bill payment instructions to CSP 1008, as seen at 1020. CSP 1008 in turn sends the bill payment information to the system 1006, as at 1022. The system sends funds and data electronically to BSP 1004, as at 1024. The BSP 1004 posts payment information to the biller 1002, as at 1026.

Note that in some instances, billers 1002 can connect directly to BPPS 1006 without the use of BSP 1004. In such cases, billers 1002 exchange presentment and payment data directly with BPPS 1006.

Database(s) 1099 include biller directory 1097, customer database 1095, and/or bill presentment database 1094; databases 1097, 1095, 1094 can be accessed by BPPS 1006 via a suitable database program 1093. MasterCard's RPPS Biller Directory is a non-limiting example of biller directory 1097. Each biller in the biller directory is identified by a unique Biller ID. Records in the biller directory 1097 will also typically include the name and address information for the biller corresponding to the Biller ID, as well as the biller's demand deposit account to which payments should be routed. Of courses, other embodiments could use a different database configuration than that shown and described herein. Customer database 1095 includes, in one or more embodiments, the customer's name, address, and postal code, and for each payment, time stamp for the payment, Biller ID, and amount. In a non-limiting example, bill presentment can be carried out via a web site operated by an underlying bank. The bank will typically have a Party ID and Party Collection ID. The Party ID will identify unique individuals. The Party Collection ID will be for a household including one or more individuals. Thus, customer database 1095 can include household IDs with associated data and individual IDs with associated data. It should be noted that in some cases, some data referred to as residing in customer database 1095 (e.g., customer's home address) may be maintained by customer service provider(s) 1008 rather than electronic BPPS 1006; database 1095 may thus, in some cases, be implemented as a composite of several databases maintained by customer service provider(s) 1008 and electronic BPPS 1006. Bill presentment database 1094 may include "raw" presentment data. A non-limiting example of bill presentment data such as would typically be available in database 1094, representing bill presentment as described with regard to 1012, 1014, 1016, 1018, includes Time Stamp, Payee, Minimum due, Total Balance, and Due Date. Of course, there would be many users of the electronic BPPS, and there would typically be many bill presentment records for each user.

In one or more embodiments, BPPS interfaces with a BBPN platform 500 via a suitable BPPS interface 506 (e.g., application program interface (API) or the like), discussed elsewhere herein.

Again, note that "BPPS" is used herein as shorthand for an electronic "bill presentment and payment system"; the RPPS system is a non-limiting example of such a system.

FIG. 7 shows a current process 1100 for making electronic funds transfers (EFT) for bill payment or the like. An originating depository financial institution (ODFI) 1102, also known as an originator, sends instructions (e.g., payment data and remittance data) using a network such as the automated clearing house (ACH) 1104, Swift, EPN, CHIPS, Fedwire, and the like, as seen at 1108. As shown at 1110, the ACH or similar network 1104 relays the instructions to the receiving depository financial institution (RDFI) (e.g., receiver or a lockbox), designated 1106. In some embodiments, an ACH file format can be used; non-limiting examples of ACH file formats include the NACHA ACH CIE, NACHA ACH PPD, or NACHA ACH CCD (e.g. for corporate-to-corporate cases) file formats. Other formats can also be used; for example, extensible markup language (XML). It should be noted that a variety of networks can be used, both public (for example, ACH) and proprietary (for example, the aforementioned MASTERCARD RPPS system).

Figure 5:
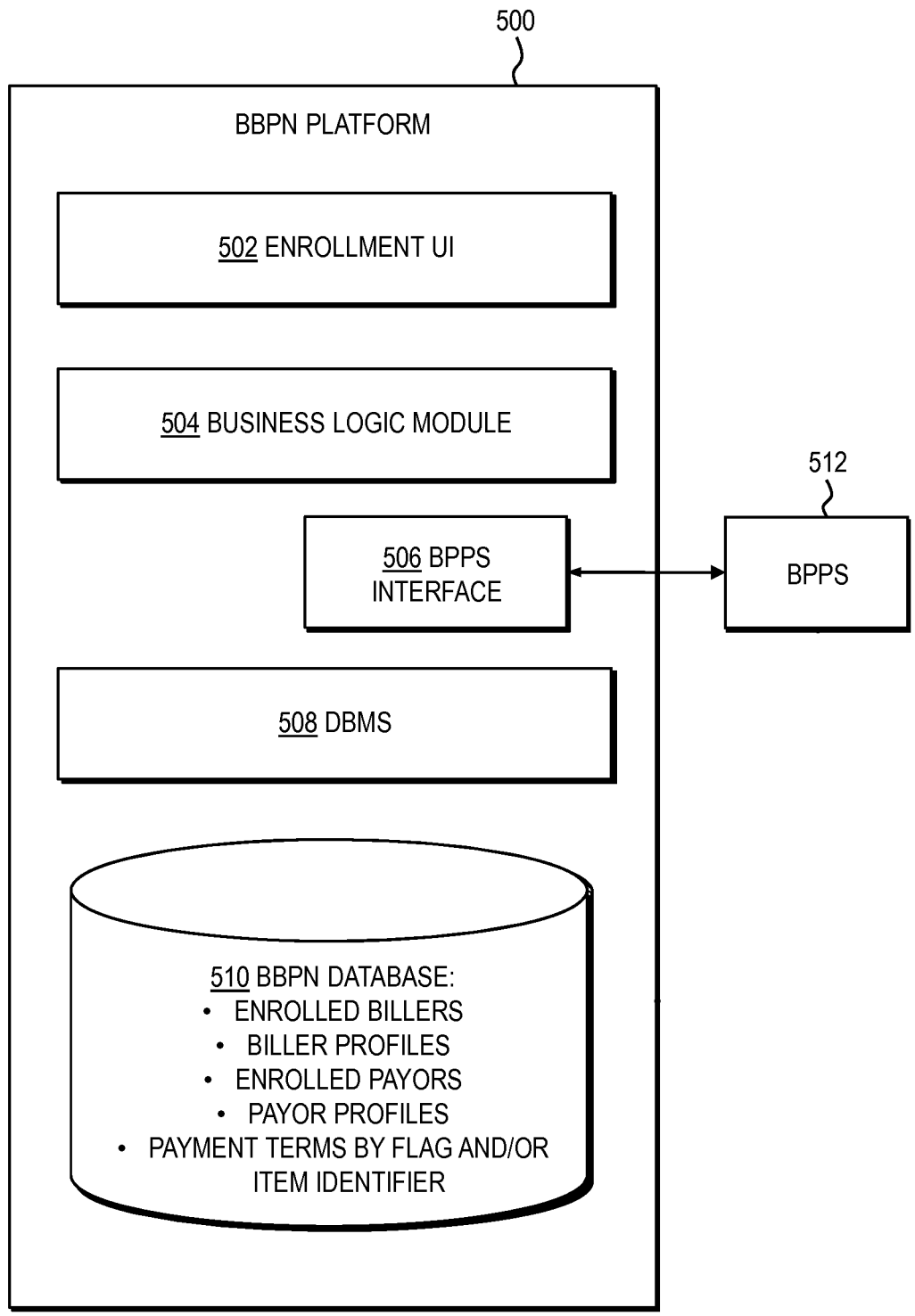
FIG. 5 is an exemplary software architecture diagram for a by-item bill payment program platform, in accordance with an aspect of the disclosure.

As used herein, an "electronic bill presentment system using customer service providers" refers to a system wherein electronic bills are distributed from billers, through an aggregator switch, out to financial institutions or other customer service providers such that those financial institutions or other customer service providers can display the electronic bills, through the financial institutions' or other customer service providers' own on-line banking interface, to bill-paying customers of the financial institutions or other customer service providers. FIG. 5 of the above-referenced US Patent Publication 2011-0251952 A1 of Mary L. Kelly et al. shows an exemplary block diagram of an electronic bill presentment system, including a bill payment platform and a bill presentment platform; the bill payment platform may utilize techniques disclosed in the above-referenced US Patent Publication 2012-0197788 A1 of Hemal Sanghvi et al.

Some electronic bill payment systems use the NACHA ACH Standard Entry Class (SEC) formats, such as CIE (Customer Initiated Entries), CTX (Corporate trade exchange); CCD (Cash Concentration or Disbursement); or PPD (Prearranged payment and deposits). Some electronic bill payment systems use a modified form of the NACHA CIE (MOD-CIE) wherein a payment system operator requires specific values for certain fields. Some electronic bill payment systems (e.g., MASTERCARD RPPS) provide translation capability and can receive input in many different formats, translate it for internal use, and translate it again for output in many different formats, which may be the same as or different from the input formats. Some electronic bill payment systems provide customer service providers with the capability to specify when the electronic bill payment system will look to them for payment instructions. Some electronic bill payment systems provide biller service providers with the capability to specify when the electronic bill payment system will initiate payments. FIG. 5 of the above-referenced US Patent Publication 2012-0197788 A1 of Hemal Sanghvi et al. shows exemplary system interfaces of an electronic bill payment system.

As noted above, electronic bill presentment and payment systems are conceptually different than payment card networks, and will often use electronic funds transfer from a demand deposit account. Nevertheless, some electronic bill presentment and/or payment systems receive and send data over a network such as is shown in FIG. 2, using capability such as MasterCard Global File Transfer (GFT). Furthermore, US Patent Publication 2010-0100480 of Theresa Altman et al., hereby expressly incorporated by reference herein in its entirety for all purposes, describes a system wherein payment of a bill using a payment card account is facilitated by formatting and dispatching a message from a bill payment provider to an electronic bill payment system. The message is flagged with a flag indicating that the message includes a non-financial, card payment, message. The message includes an identification of the biller, a card number of the payment card account, and an expiration date of the payment card account. The message is an electronic funds transfer message augmented with the flag, the card number, and the expiration date.

Some electronic bill payment systems use technology such as described in the above-referenced US Patent Publication 2013-0290177 A1 of Milam and Klaus to reduce the number of non-electronic payments. Some electronic bill payment systems use technology such as described in the above-referenced US Patent Publication 2013-0311362 A1 of Amy C. Milam et al. to facilitate approximately matching entered payee information to stored biller information.

By-Item Bill Payments and Exemplary Implementation Thereof Via an Electronic BPPS or the Like In certain scenarios, a biller may find it beneficial to handle different items on the same invoice in accordance with different payment terms. For instance, a cell phone service provider typically generates an invoice each month for cell phone service charges incurred by a consumer/payor during that month. Each of these recurring invoices for cell phone service charges is typically managed in accordance with standard "pay now" payment terms, meaning that the payor is responsible for payment of the invoice in full upon receipt. From time to time, the cell phone service provider may offer products for sale (e.g., cell phones, tablet computing devices, and the like) which are added to the monthly invoice for cell phone service charges and handled using the same standard pay now payment terms. So as not to incur a large bill which must be paid promptly, the consumer may decide to either delay the purchase until adequate funds are available, or the consumer may decide to purchase the hardware from another vendor offering an installment-type payment option.

Advantageously, one or more embodiments of the disclosure provide a by-item bill payment solution which enables a biller to divide an invoice into two or more subsets of items, based at least in part on the nature of the item(s) purchased, and to assign different payment terms to the respective subsets of items on the same invoice/bill. This approach may be provided, for example, to billers and payors who are registered (i.e., enrolled) members of a by-item bill payment network according to one or more embodiments of the invention. Consumers benefit from this by-item bill payment network by having the ability to pay for more expensive items over time (i.e., in installments) while using standard pay now payment terms for other items on the invoice (e.g., monthly cell phone service fees). Likewise, billers benefit from the by-item bill payment network by having a centralized mechanism for coordinating and facilitating the collection of funds from consumers using two or more different payment terms for payment of multiple items on the same bill, thereby providing an incentive for consumers to purchase more expensive items from the biller in addition to the traditional goods and/or services that the consumer is already receiving from the biller.

Figure 3:
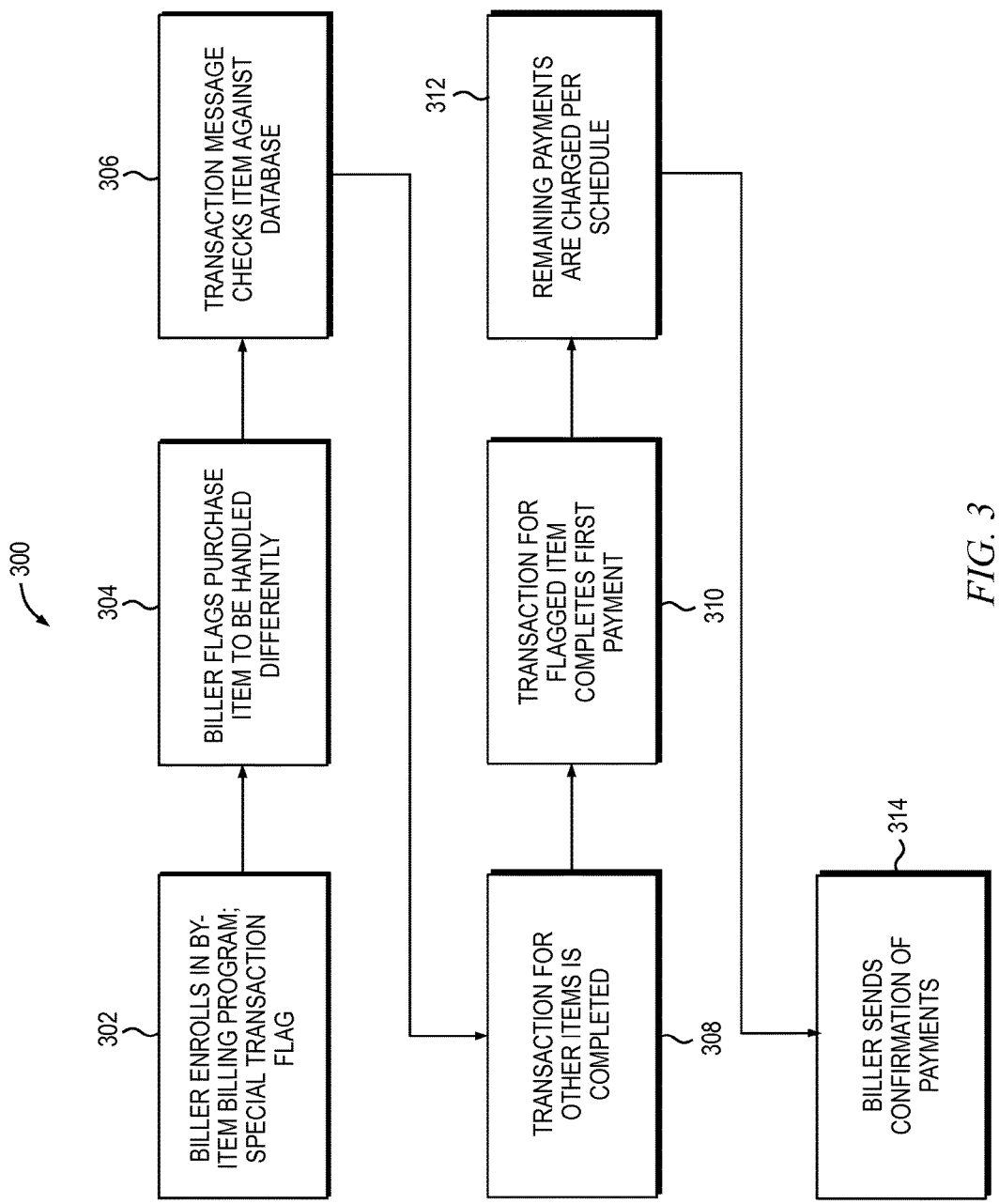
FIG. 3 is a flow diagram depicting at least a portion of an exemplary by-item bill payment method, from the standpoint of a biller, in accordance with an aspect of the disclosure.
Figure 4:
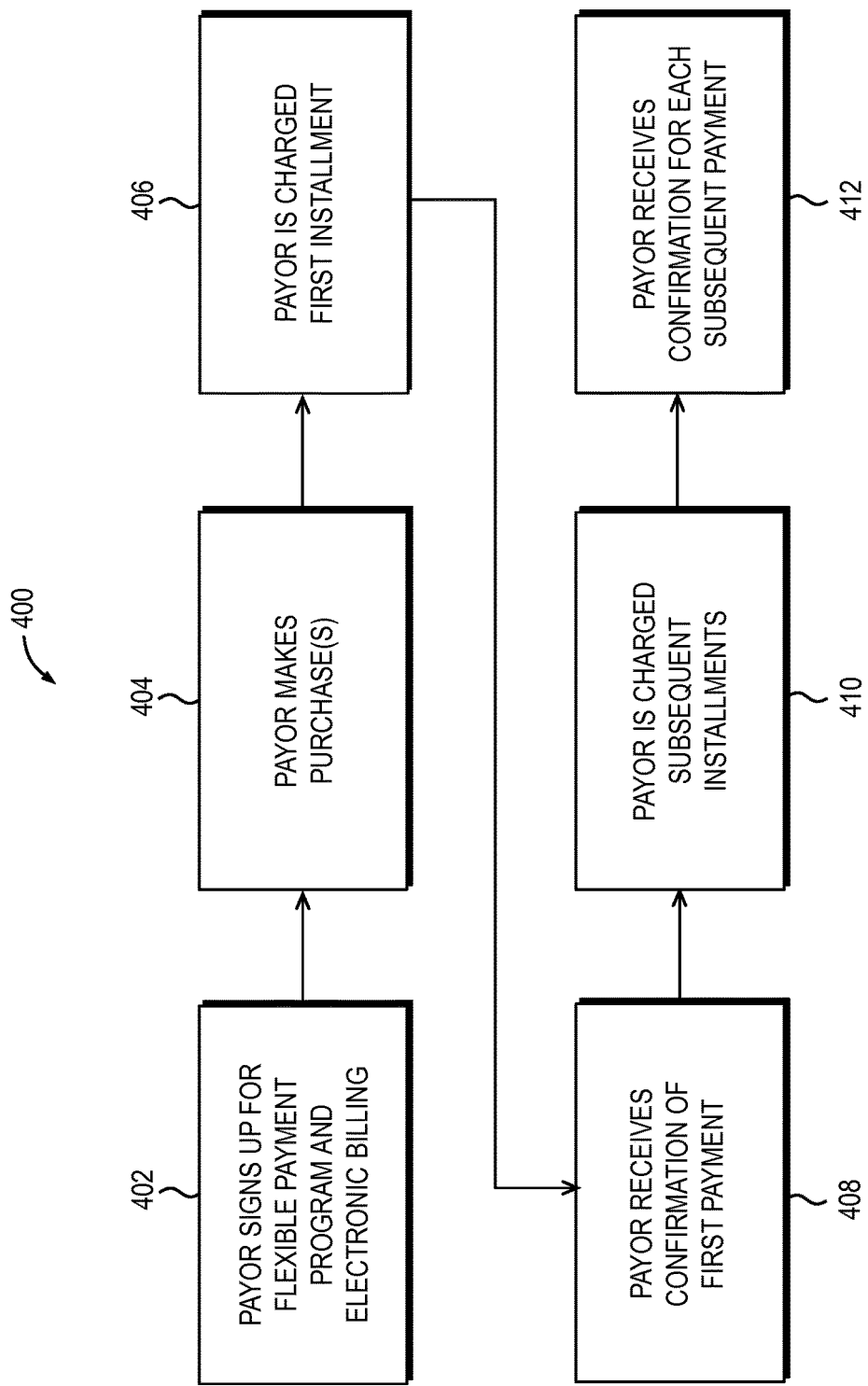
FIG. 4 is a flow diagram depicting at least a portion of an exemplary by-item bill payment method, from the standpoint of a payor, in accordance with an aspect of the disclosure.

By way of example only and without limitation or loss of generality, an illustrative operation of an exemplary by-item bill payment service according to one or more embodiments of the disclosure will be described in further detail conjunction with FIGS. 3 and 4. Specifically, FIG. 3 is a flow diagram depicting at least a portion of an exemplary by-item bill payment method 300, from the standpoint of a biller (e.g., biller 1002 in FIG. 6), in accordance with an aspect of the disclosure. FIG. 4 is a flow diagram depicting at least a portion of an exemplary by-item bill payment method 400, from the standpoint of a payor (e.g., customer 1010 in FIG. 6), in accordance with an aspect of the disclosure. In describing the exemplary methods 300 and 400 shown in FIGS. 3 and 4, respectively, it will be assumed that a payment network or other service, for example, a by-item bill payment network (BBPN), has been established. Billers and payors enroll in or otherwise register to become part of the BBPN in order to utilize features available through the BBPN. According to one or more embodiments, by registering for the BBPN service, payors agree to pay bills for services issued by a biller (or billers) electronically, through the BBPN, from that point forward.

The BBPN, according to one or more embodiments, is an operational network or service (e.g., governed by prescribed rules and/or standards) which facilitates communication between one or more billers and one or more payors for the purpose of conducting financial transactions (e.g., bills and payments). In at least some instances, the BBPN is implemented via a BBPN platform coupled to a known BPPS. Some embodiments make use of an Internet application (app), smartphone app, or the like. Some embodiments utilize web browser functionality. The BBPN is managed or otherwise maintained by a centralized third party entity, such as MasterCard International Inc., according to one or more embodiments.

One or more embodiments involve opt-in (e.g., via registration or enrollment) to the by-item bill payment service by both billers and payors. More particularly, with reference to FIG. 3, which relates to the illustrative bill payment method 300 from the standpoint of a biller, one or more billers enroll in a by-item billing program via the BBPN in step 302. In accordance with an aspect of the disclosure, the BBPN preferably leaves a biller's existing infrastructure intact, and thus in one or more embodiments, a biller need only be able to receive electronic payments in order to use the BBPN with its existing system essentially without modification. To enroll, a biller would agree to accept payment through the BBPN in accordance with the terms of a BBPN user agreement, for example.

Biller enrollment may involve, in one or more embodiments, a biller providing prescribed identifying information, such as, for example, company name, address and telephone number, email address, account number(s), etc. Enrollment indicates that the biller is an entity willing to participate in the BBPN service. The biller may be assigned a unique account number by the BBPN, and may select a user name and password for accessing the by-item billing program. In one or more embodiments, as part of the enrollment process, the biller may download a biller application for use on its computing device (e.g., personal computer (PC), tablet computer, laptop computer, etc.) for providing secure access to the by-item billing program through the BBPN. This biller application may, in one or more embodiments, enable the biller to identify items and their corresponding payment terms associated with a given invoice and to track payments submitted in connection with the invoice. Once enrollment of the biller in the by-item billing program is complete, the biller can avail itself of the services provided through the BBPN.

In one or more non-limiting embodiments, a payor may employ a smart phone application while a biller may employ the above-mentioned downloadable biller application or web-based interface.

Similarly, with reference to FIG. 4, which relates to the illustrative bill payment method 400 from the standpoint of a payor, one or more payors elect to become part of the by-item billing program, and optionally for electronic billing, by enrolling through the BBPN in step 402. As part of the enrollment process, a payor may provide prescribed identifying information, such as, for example, his or her personal information (e.g., name, home and business addresses, phone number(s), etc.), proof of salary, employer, bank account number(s), and the like. The payor may be assigned a unique account number by the BBPN, and may select a user name and password for logging into the by-item billing program. As part of the enrollment process, the payor may download a payor/consumer app for his or her smartphone, tablet computer, laptop computer, personal digital assistant (PDA), PC, or other personal computing device, for providing secure access to the by-item billing program through the BBPN, according to one or more embodiments. Once enrollment of the payor in the by-item billing program is complete, the payor can avail himself or herself of the services provided through the BBPN.

With continued reference to FIG. 4, a payor enrolled in the by-item billing program makes a purchase or purchases (e.g., a service and/or product) through the BBPN in step 404. The biller enrolled in the by-item billing program receives the purchase information through the BBPN and, depending upon the nature of the item(s) purchased, may flag the purchase(s) as being handled in accordance with a first set of payment terms that are different than at least a second set of payment terms associated with products or services typically provided or managed in that payor's budget, as shown in step 304 of FIG. 3. The purchase(s) may be flagged or otherwise identified, in one or more embodiments, using a suitable mechanism (e.g., biller and operator of BBPN pre-populate a database with payment terms versus item number or with payment terms corresponding to pre-defined codes). An invoice is generated, as part of step 304, which includes the multiple charges being handled under different payment terms.

Consider, by way of example only, a cell phone company that typically bills a consumer/payor on a monthly basis for recurring cell phone services that have pay now payment terms associated therewith. Furthermore, consider that the consumer purchases a tablet computing device offered for sale by the cell phone company who agrees to allow the consumer to purchase the item in installments over 6 months, rather than in accordance with terms typically applied to cell phone service charges (e.g., pay now or net 30); that is, the cell phone company identifies (e.g., flags) the tablet computing device as a purchase that is to be handled under different payment terms compared to the typical recurring cell phone service charges.

In step 306 of FIG. 3, the flagged item(s) are checked against a database (as a result of a transaction message such as an invoice). As the transaction message arrives, individual items are billed according to the parameters established by the biller. The database provides a mechanism which enables the biller to easily indicate what billing terms should be used for a given item. In one or more embodiments, the database against which the transaction message is checked is part of the BBPN, although the invention is not limited to such an arrangement. In one or more embodiments, a new database is created to keep track of how payments are to be handled (e.g., installment payment schedule).

When a charge is incurred by a payor who is enrolled in the by-item billing program, for example by directly purchasing a product/service from the biller that is to be handled under a different payment term than other charges incurred by the payor, the payor is charged the first installment for the purchased item that is being handled under the different payment terms (e.g., installment payment terms rather than pay now payment terms) in step 406.

In one or more embodiments, the biller generates an invoice including multiple items purchased by the payor. One or more of the items on the biller's invoice are identified (e.g., flagged) as being handled under first payment terms (e.g., installment payment terms) that are different than second payment terms (e.g., pay now or net 30 payment terms) associated with one or more other items on the invoice. The BBPN obtains (e.g., receives) the biller's invoice and, in one or more embodiments, the BBPN generates at least one modified invoice (e.g., using business logic module 504 shown in FIG. 5 or an alternative module), which is subsequently sent via the BBPN to the payor who incurred the charges. The modified invoice generated by the BBPN may include the first installment for the purchased item handled under the first payment terms as well as charges incurred by the payor for other items/services handled under the second payment terms (e.g., pay now payment terms). Alternatively, the BBPN may generate multiple modified invoices, so that the first installment for the purchased item handled under the first payment terms may be billed separately from other services/items incurred by the payor handled under the second payment terms.

With reference to FIG. 3, when the payor makes a payment for the total amount billed which includes charges handled under multiple payment terms, the BBPN allocates an appropriate portion of the total payment to complete the transaction for other items handled under the second payment terms in step 308 and allocates a remaining portion of the payment for completing the first installment transaction corresponding to the flagged item in step 310 handled under first payment terms (e.g., first installment payment schedule). In step 308, the other items may represent, for example, standard monthly service charges incurred by the payor to be handled under pay now or net 30 payment terms. Alternatively, the other items in step 308 may represent, for example, one or more items purchased by the payor from the biller that are to be handled under third payment terms (e.g., a second installment payment schedule which is different than the first installment payment schedule associated with the flagged item in step 304, net 60 payment terms, etc.). The remaining payments for the flagged item purchased by the payor are charged, in step 312, according to the payment schedule associated with the first payment terms.

The invoice generated by the biller can be transmitted to the BBPN via proprietary or known communication techniques and formats. BPPS functionality as described elsewhere herein can be employed in some instances; other non-limiting possibilities include an application program interface (API) or the like, a PDF file, etc. It is to be appreciated that embodiments of the disclosure are not limited to any specific format, protocol or method of transmission of the invoice to a corresponding payor, unless such limitations are expressly recited. Upon receiving the invoice from the biller, in one or more embodiments, the BBPN matches the invoice to the corresponding payor who has enrolled in this by-item payment service and, as a part of step 306, assigns payment terms to the multiple items on the invoice according to the prescribed payment terms for the incurred charges (e.g., pay now, installment, etc.) stored in the BBPN (e.g., in a database or other storage module).

In one or more embodiments, payment of an invoice is made electronically through the BBPN using various techniques, including, but not limited to, those available in an electronic BPPS. Such payments can involve an electronic funds transfer from a demand deposit account or the like, or could involve a card-based transaction including entering the payor/cardholder's account number or other information (e.g., for an online transaction), or by swiping the card (e.g., for a point-of-sale transaction). In some embodiments, the BBPN, upon receiving the payment information associated with a card-based transaction, initiates an authorization request and receives an authorization response corresponding thereto, followed by clearing and settlement for the prescribed portion of the total invoice amount.

With reference to FIG. 4, after the payor submits payment for the total amount invoiced by the biller, which includes payments for multiple items purchased that are being handled under different payment terms, the payor obtains confirmation of the first installment payment in step 408 through the BBPN. In one or more embodiments, the payor may obtain confirmation of payment for the remaining item(s) associated with the invoice (e.g., charges for services/items handled under pay now payment terms). In step 410, the payor is charged subsequent installments for the item purchased under the installment payment terms according to the installment payment schedule.

In one or more embodiments, the biller, in step 314 of FIG. 3, sends a separate confirmation of payments received from the payor through the BBPN for each subsequent installment charged. The payor, in step 412 of FIG. 4, obtains a separate confirmation from the biller through the BBPN for each subsequent payment made. Alternatively, in one or more embodiments, the biller may send out a single confirmation to the payor via the BBPN in step 314 indicating that all installment payments for the flagged item(s) have been received in settlement of the purchase transaction for the flagged item(s). In one or more embodiments, the confirmation of payments made by the payor may be sent by the biller, via the BBPN, in the form of an online statement, such as, for example, via an app, email, Internet notification, or the like, a text message sent to the payor's cell phone, or an alternative notification. It is to be understood that embodiments of the disclosure are not limited to any specific notification transmission means or format, unless expressly recited.

In FIGS. 3 and 4, it is assumed that billers and payors have already enrolled in the by-item payment service (e.g., steps 302 and 402). In one or more alternative embodiments, the option to pay for a product or service according to different payment terms may not be an ecommerce transaction but may be offered at physical locations. In this scenario, the payor would agree to make payment of an item or service in accordance with prescribed payment terms at the time of sale, and the merchant would collect the total amount from the payor, via the BBPN, according to the agreed installment payment schedule.

FIG. 5 shows at least a portion of an exemplary BBPN platform 500, according to an embodiment of the invention. In one or more embodiments, the BBPN is implemented as a new BBPN platform 500 interfacing with an existing electronic bill presentment and payment system (BPPS) 512. In some embodiments, the functionality of BBPN platform 500 is made available as a web service to the BPPS 512. The BBPN platform 500, in one or more aspects, is collocated with the BPPS 512. BBPN platform 500, in this illustrative embodiment, includes: an enrollment user interface (UI) 502; a business logic module 504; a BPPS interface 506; a database management system (DBMS) 508; and a BBPN database 510 accessed via the DBMS 508.

The business logic module 504, in one or more embodiments, is configured to modify an invoice obtained from a given one of the billers, which includes multiple charges to be handled under different payment terms, and to generate at least one modified invoice. To modify the invoice, the business logic module 504 may utilize flags or the like provided by the biller on the invoice to assign corresponding payment terms to the respective charges on the invoice, in one or more embodiments; e.g., flag "1" means due on receipt, flag "2" means net 30 days, flag 3 means 12 monthly installments at 6% interest, and so on. Alternatively, the business logic module 504 may be configured to retrieve payment term information from the BBPN database 510, which, in one or more embodiments, stores a correspondence between respective items and their payment terms as a function of an item identifier (e.g., a "SKU" (stock-keeping unit), "UPC" (Universal Product Code) or the like). For example, SKU 123 is a pack of 9V batteries due on receipt; SKU 456 is a toner cartridge due net 30 days, SKU 789 is a high-end audio system payable in 12 monthly installments at 6% interest, and so on. The database does not necessarily need the actual description of the item as long as the payment terms are correlated with the item identifier. The business logic module 504 may direct the BBPN to generate a single modified invoice including the first installment for the purchased item handled under the first payment terms as well as charges incurred by the payor for other items/services handled under the second payment terms (e.g., pay now payment terms). Alternatively, the business logic module 504 may direct the BBPN to generate multiple modified invoices, so that the first installment for the purchased item handled under the first payment terms is billed separately from other services/items incurred by the payor handled under the second payment terms.

The BBPN database 510, in one or more embodiments, is configured to store prescribed information associated with enrolled billers and enrolled payors (e.g., list of enrolled billers, biller profiles, list of enrolled payors, payor profiles, etc.). The BBPN database 510, in one or more embodiments, stores additional information as well, such as, for example, payment terms and associated services/items. The BBPN database 510 may also store, in other embodiments, general system configuration information and the like, which may be used for controlling one or more operational parameters of the system.

The BPPS interface 506, in one or more embodiments, is in operative communication with the BPPS 512 and is configured to control the transmission of information between the BPPS 512 and the BBPN platform 500. The BPPS 512 may access information relating to biller and/or payors through interface 506 and DBMS 508.

At least a portion of the information included in database(s) 1099 shown in FIG. 6, or a copy thereof, may, in one or more embodiments, reside in the BBPN database 510, or vice versa; e.g., biller information may reside in database 510 and/or in biller directory 1097.

Thus, in one or more embodiments, the enrollment process identifies a biller as an entity willing to participate in the BBPN service. One or more embodiments leave intact the billers' usual way(s) of receiving payments. A payment comes in with an amount and an account number to which the amount of payment should be applied. In some cases, the biller does not necessarily need a new application or any new functionality other than the general ability to receive electronic payments (however, an app or web site may be provided for payment status monitoring or other functionality as discussed elsewhere). In one or more embodiments, the system "knows" that the biller is enrolled as follows: the biller agrees to some separate paperwork or other form of assent and a flag is turned on in the consumer app itself saying, e.g., Biller X is now accepting payments this way. One or more embodiments advantageously expand upon existing biller infrastructure, which remains largely intact. As noted, though, in one or more embodiments, billers are provided access to the status of bill payments. In one or more embodiments, a mechanism is provided for billers to access this information; in some cases, it could be a biller application or web site to which billers have access. Thus, in one or more embodiments, the biller does not necessarily need to download an app or modify their exiting billing systems, but they are provided some mechanism to keep track of the by-item bill payments.

In one or more embodiments, business rules will be specified in biller profiles, such as total amount allowed to spend, payment terms associated with particular items, etc. A suitable logic module can be provided to check and see if a presentment message requires special handling and, if so, what the trigger will be—for example, if flagged items on a biller invoice match flags in database 510 and/or 1099, call the logic module and feed back to the BPPS a modified invoice including the corresponding payment terms for each of the flagged items for presentation to the payor.

One or more embodiments employ a BPPS with new logic and new registration or database entries, such that when multiple purchases are incurred by a given payor, there is a bill presentation to the payor which includes the multiple items handled in accordance with different payment terms. The bill is directed to a single payor who registers with service provided by BBPN platform 500. There is a flag or other identifier associated with each of at least a subset of the purchased items, such that when the system see John Smith's bill, the system is able to modify the biller invoice to assign different payment terms to the corresponding purchases. BBPN platform 500 provides a web service or the like that interfaces with the BPPS. Both presentment and payment aspects of the BPPS are used in one or more embodiments.

Thus, one or more embodiments employ a BPPS or the like with a new service (e.g. web or other service 500 within the BPPS or external to the BPPS with an API or other interface 506 to the BPPS). The new service has registration of payors. While the BBPN platform can be an external service that interfaces with the BPPS, some data may be shared, because there is typically already a biller directory within the BPPS.

Recapitulation

Given the discussion thus far, and with continued reference to FIGS. 3 through 6, it will be appreciated that, in general terms, an exemplary method according to an aspect of the disclosure includes the step of enrolling a plurality of billers in a by-item bill payment program, via a by-item bill payment platform module (e.g., implementing platform 500) executing on at least one hardware processor (e.g., 820). A further step includes obtaining an invoice from a given one of said billers (e.g. 1002) via a bill presentment and payment system platform module (e.g., implementing at least a portion of BPPS 1006) executing on said at least one hardware processor. The bill presentment and payment system platform module is in data communication with said by-item bill payment platform module, and the invoice includes multiple charges corresponding to at least one of goods and services purchased from the given one of said billers by a first payor (e.g. 1010). For example, the invoice includes charges for a pack of 9V batteries and a high-end audio system. A still further step includes modifying the invoice obtained from the given one of said billers, based at least in part on said enrolling step, via said by-item bill payment platform module executing on said at least one hardware processor, to generate at least one modified invoice including multiple charges corresponding to at least one of goods and services purchased from the given one of said billers by said first payor. At least a first one of the charges is handled under first payment terms and at least a second one of the charges is handled under second payment terms. The first and second payment terms are different relative to one another. For example, in one embodiment, the pack of 9V batteries is flagged with a flag meaning due on receipt, while the high-end audio system is flagged with a flag meaning 12 monthly installments at 6% interest. Alternatively, the BBPN database 510 stores a correspondence between respective items and their payment terms as a function of an item identifier (e.g., a "SKU" (stock-keeping unit), "UPC" (Universal Product Code) or the like). For example, SKU 123 is a pack of 9V batteries due on receipt, while SKU 789 is a high-end audio system payable in 12 monthly installments at 6% interest, and so on.

Thus, business logic module looks up the payment terms corresponding to the flags or the item identifiers on the invoice in database 510 via DBMS 508 and creates one or more modified invoices based on same.

Further steps include sending said at least one modified invoice to said first payor, via said bill presentment and payment system platform module executing on said at least one hardware processor; and obtaining payment from said first payor, via said bill presentment and payment system platform module executing on said at least one hardware processor. An even further step includes allocating a first portion of the obtained payment towards said first one of the charges and allocating a second portion of the obtained payment to said second one of the charges, via said bill presentment and payment system platform module executing on said at least one hardware processor (e.g., part allocated to pay now batteries and part to first installment for audio system).

In some cases, a further step includes sending a confirmation of payment to said first payor in response to obtaining payment from said first payor; for example, via an email notification and/or a text notification.

In some instances, a further step includes enrolling a plurality of payors, including said first payor, in said by-item bill payment program, via said by-item bill payment platform module executing on said at least one hardware processor, wherein enrolling the plurality of billers and the plurality of payors in the by-item bill payment program comprises the plurality of billers and the plurality of payors providing prescribed identifying information.

Optionally, enrolling the plurality of billers and the plurality of payors in the by-item bill payment program includes at least one of the plurality of payors downloading a payor application for use on a computing device of the at least one of the plurality of payors and/or at least one of the plurality of billers downloading a biller application for use on a computing device of the at least one of the plurality of billers. The payor application and/or biller application can be configured to provide secure access to the by-item bill payment program.

Optionally, enrolling the plurality of billers and the plurality of payors in the by-item bill payment program includes assigning a unique account number to each of at least a subset of the plurality of billers and at least a subset of the plurality of payors, respectively. In some instances, billers and/or payors may have pre-existing identifying numbers from BPPS 512.

As noted, in a non-limiting example, the first payment terms could include pay now payment terms, and the second payment terms could include installment payment terms. This is non-limiting; there could be different kinds of installment (term and interest rate); different kinds of single payments (e.g., net 30 days, net 60 days, etc.) and the like.

In some cases, enrolling of said plurality of billers comprises populating a database 510, accessible to said by-item bill payment platform module executing on said at least one hardware processor, with a data structure including predefined payment terms corresponding to different item numbers to appear on invoices from said plurality of billers, including said invoice obtained from the given one of said billers (see above example correlating payment terms to UPCs or SKUs).

In some cases, enrolling of said plurality of billers comprises populating a database 510, accessible to said by-item bill payment platform module executing on said at least one hardware processor, with a data structure including codes to appear on invoices from said plurality of billers, including said invoice obtained from the given one of said billers, and predefined payment terms corresponding to said codes (see above example with payment terms corresponding to codes 1, 2, and 3). The UPC/SKU approach and code approach can be "mixed and matched" in some cases; i.e., they are not mutually exclusive, but could be so in other embodiments.

In any case involving installments, such as where the first transaction is handled in accordance with pay now payment terms and the second transaction is handled in accordance with installment payment terms, a further method step can include sending at least one subsequent invoice to the first payor for at least a portion of a remaining balance due in connection with the second one of the charges in accordance with an installment schedule prescribed in the second payment terms. This could be repeated until all the installments are paid, if desired. In some such cases, a further step includes sending a confirmation of payment to said first payor in response to obtaining payment from said first payor for said at least one subsequent invoice.

In another aspect, an exemplary apparatus includes a memory (e.g., RAM, ROM, on-processor memory of 830); at least one processor 820 operatively coupled to said memory; and a persistent storage device operatively coupled to said memory (e.g., hard drive portion of 830) and storing in a non-transitory manner instructions which, when loaded into said memory, cause said at least one processor to be configured to carry out any one, some, or all of the method steps disclosed herein.

Said instructions on said persistent storage device can include, for example, a by-item bill payment platform module implementing platform 500 and a bill presentment and payment system platform module implementing at least a portion of BPPS 1006; the modules may then carry out the method steps as described elsewhere herein.

In some cases, said instructions on said persistent storage device further comprise an enrollment user interface sub-module 502, a business logic sub-module 504, a database management system sub-module 508, and a by-item bill payment network platform-bill presentment and payment system interface module 512. In such cases, said at least one processor is operative to enroll said plurality of billers by executing said enrollment user interface sub-module to access said database management system sub-module; said bill presentment and payment system platform module is in data communication with said by-item bill payment platform module via said by-item bill payment network platform-bill presentment and payment system interface module; and said at least one processor is operative to modify said invoice in response to a determination by said business logic sub-module.

System and Article of Manufacture Details

Embodiments of the disclosure can employ hardware and/or hardware and software aspects. Software includes, but is not limited to, firmware, resident software, microcode, etc. Software might be employed, for example, in connection with one or more of BBPN platform 500 and its related enrollment UI 502, business logic module 504, BPPS interface 506, DBMS 508, and DB 510; a terminal 122, 124, 125, 126; a reader module 132; a host, server, and/or processing center 140, 142, 144 (optionally with data warehouse 154) of a merchant, issuer, acquirer, processor, or operator of a payment network 2008, operating according to a payment system standard (and/or specification); and the like. Firmware might be employed, for example, in connection with payment devices such as cards 102, 112, as well as reader module 132.

Figure 8:
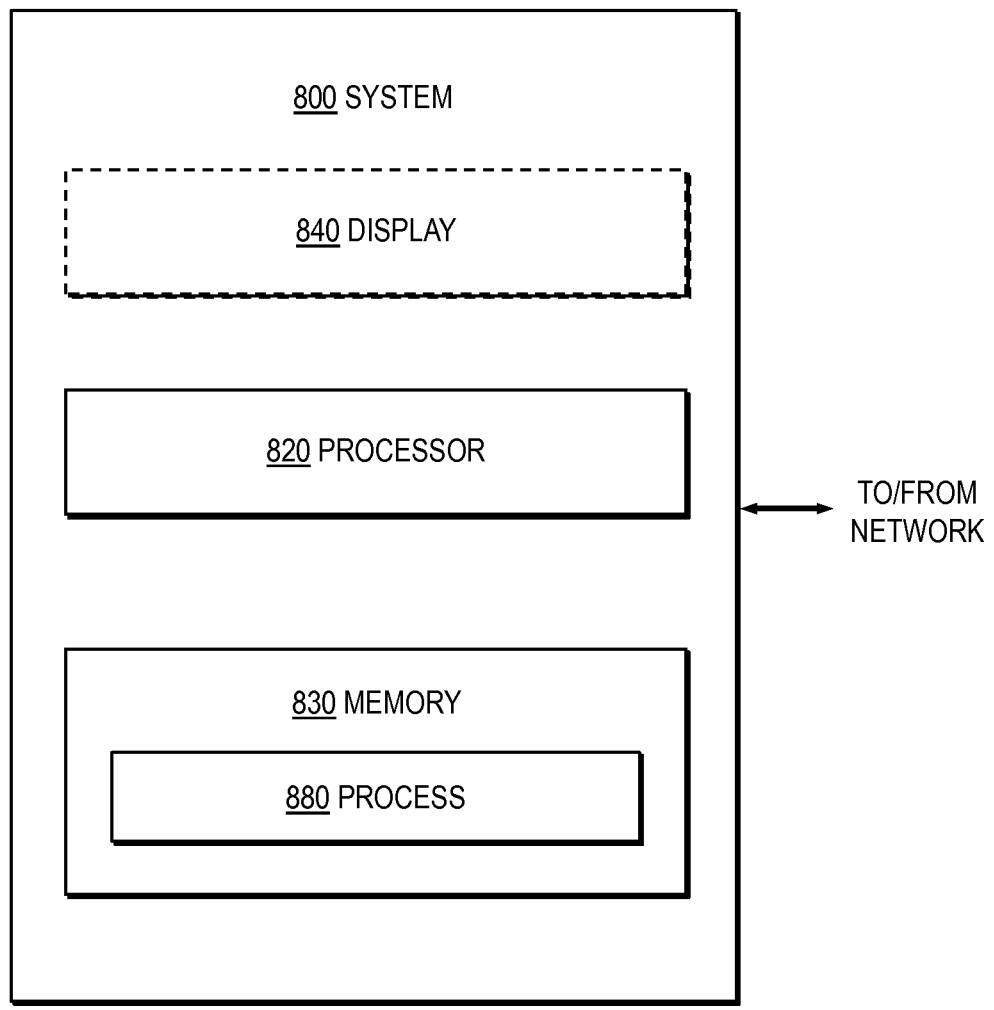
FIG. 8 is a block diagram of at least a portion of an exemplary computer system useful in one or more embodiments of the disclosure.

FIG. 8 is a block diagram of a system 800 that can implement part or all of one or more aspects or processes of the disclosure. As shown in FIG. 8, memory 830 configures the processor 820 (which could correspond, e.g., to processor portions 106, 116, 130; a processor of a terminal or a reader module 132; processors of remote hosts in centers 140, 142, 144; processors of hosts and/or servers implementing various functionality; and the like); to implement one or more aspects of the methods, steps, and functions disclosed herein (collectively, shown as process 880 in FIG. 8). Different method steps can be performed by different processors. The memory 830 could be distributed or local and the processor 820 could be distributed or singular. The memory 830 could be implemented as an electrical, magnetic or optical memory, or any combination of these or other types of storage devices (including memory portions as described above with respect to cards 102, 112). It should be noted that if distributed processors are employed, each distributed processor that makes up processor 820 generally contains its own addressable memory space. It should also be noted that some or all of computer system 800 can be incorporated into an application-specific or general-use integrated circuit. For example, one or more method steps could be implemented in hardware in an application-specific integrated circuit (ASIC) rather than using firmware. Display 840 is representative of a variety of possible input/output devices (e.g., displays, printers, keyboards, mice, touch pads, and so on).

System 800 is generally representative of a server implementing BBPN platform 500 shown in FIG. 5 and a client device accessing same, for example.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on one, some, or all of elements 122, 124, 125, 126, 140, 142, 144, 2004, 2006, 2008, 2010; on a computer implementing BBPN platform 500; a client interfacing with same; and the like. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the disclosure, such as, for example, 122, 124, 125, 126, 140, 142, 144, 2004, 2006, 2008, 2010; a computer implementing BBPN platform 500; a client interfacing with same; and the like, can make use of computer technology with appropriate instructions to implement method steps described herein. Some aspects can be implemented, for example, using one or more servers that include a memory and at least one processor coupled to the memory. The memory could load appropriate software. The processor can be operative to perform one or more method steps described herein or otherwise facilitate their performance.

Accordingly, it will be appreciated that one or more embodiments of the disclosure can include a computer program product comprising computer program code means adapted to perform one or all of the steps of any methods or claims set forth herein when such program is run on a computer, and that such program may be embodied on a computer readable medium. Further, one or more embodiments of the present disclosure can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 800 as shown in FIG. 8) running a server program. It will be understood that such a physical server may or may not include a display, keyboard, or other input/output components. A "host" includes a physical data processing system (for example, system 800 as shown in FIG. 8) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include an enrollment user interface module implementing enrollment UI 502, a business logic module implementing business logic module 504, a BPPS interface module implementing BPPS interface 506, and a database management system (DBMS) module implementing DBMS 508; together with BBPN database 510 forming BBPN platform 500 shown in FIG. 5. Database 510 is stored in non-volatile (persistent) memory such as a hard drive or drives and accessed by DBMS 508. Input and output can be provided via UI 502. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

One example of an enrollment user interface module to implement enrollment UI 502 is hypertext markup language (HTML) code served out by a server operated by payment network 2008 or the like, to a browser of a computing device of a user. The HTML is parsed by the browser on the user's computing device to create a graphical user interface (GUI). In some cases, payment network 2008 may operate a service for an issuer 2010, merchant 2004, or the like and the enrollment UI 502 involves an API or the like that provides the issuer or merchant with access to BBPN database 510; the user in such cases may interact, for example, with a GUI provided by the issuer and/or merchant.

Computers discussed herein can be interconnected, for example, by one or more of network 138, 2008, another virtual private network (VPN), the Internet, a local area and/or wide area network (LAN and/or WAN), via an EDI layer, and so on. Note that element 2008 represents both the network and its operator. The computers can be programmed, for example, in compiled, interpreted, object-oriented, assembly, and/or machine languages, for example, one or more of C, C++, Java, Visual Basic, COBOL, Assembler, Structured Query Language (SQL), and the like (an exemplary and non-limiting list), and can also make use of, for example, Extensible Markup Language (XML), known application programs such as Neo4j, an open-source graph database or similar graph database, relational database applications (e.g., IBM DB2® software available from International Business Machines Corporation, Armonk, N.Y., US; SAS® software available from SAS Institute, Inc., Cary, N.C., US), spreadsheets (e.g., MICROSOFT EXCEL® software available from Microsoft Corporation, Redmond, Wash., US), and the like. SQL or Structured Query Language is a special-purpose programming language designed for managing data held in a relational database management system (RDMS). SQL and RDMS are non-limiting examples of suitable query techniques and database management systems, respectively. The computers can be programmed to implement the logic and/or data flow depicted in the figures. In some instances, messaging and the like may be in accordance with ISO Specification 8583 Financial transaction card originated messages—Interchange message specifications and/or the ISO 20022 or UNIFI Standard for Financial Services Messaging, also incorporated herein by reference in its entirety for all purposes.

Although illustrative embodiments have been described herein with reference to the accompanying drawings, it is to be understood that those precise embodiments are non-limiting, and that various other changes and modifications may be made by one skilled in the art without departing from the scope or spirit of the disclosure.

What is claimed is:

1. A method, comprising the steps of:
   at least one hardware processor implementing a by-item bill payment network and a bill presentment and payment system platform module coupled to a payment network connecting a plurality of billers to at least a first payor, said by-item bill payment network further comprising an enrollment user interface module, a business logic module, a database management system module, and a by-item bill payment network platform-bill presentment and payment system interface module;
   enrolling a plurality of billers in said by-item bill payment network, by executing said enrollment user interface module to access said database management system module;
   obtaining an invoice from a given one of said billers via said bill presentment and payment system platform module executing on at least one hardware processor, said bill presentment and payment system platform module being in data communication with said by-item bill payment platform network via said by-item bill payment network platform-bill presentment and payment system interface module, the invoice including multiple charges corresponding to at least one of goods and services purchased from the given one of said billers by said first payor;
   modifying the invoice obtained from the given one of said billers, based at least in part on said enrolling step, via said business logic module of said by-item bill payment platform network executing on said at least one hardware processor, to generate at least one modified invoice including multiple charges corresponding to said at least one of goods and services purchased from the given one of said billers by said first payor, at least a first one of the charges being handled under first payment terms and at least a second one of the charges being handled under second payment terms, the first and second payment terms being different relative to one another;
   sending said at least one modified invoice to said first payor, via said bill presentment and payment system platform module executing on said at least one hardware processor;
   obtaining payment from said first payor, via said bill presentment and payment system platform module executing on said at least one hardware processor; and
   allocating a first portion of the obtained payment towards said first one of the charges and allocating a second portion of the obtained payment to said second one of the charges, via said bill presentment and payment system platform module executing on said at least one hardware processor.

2. The method of claim 1, further comprising sending a confirmation of payment to said first payor in response to obtaining payment from said first payor.

3. The method of claim 2, wherein the confirmation of payment comprises at least one of an email notification and a text notification.

4. The method of claim 1, further comprising enrolling a plurality of payors, including said first payor, in said by-item bill payment program, by executing said enrollment user interface module to access said database management system module, wherein enrolling the plurality of billers and the plurality of payors in the by-item bill payment program comprises the plurality of billers and the plurality of payors providing prescribed identifying information, and wherein said payment network connects said plurality of billers to said plurality of payors.

5. The method of claim 4, wherein enrolling the plurality of billers and the plurality of payors in the by-item bill payment program comprises at least one of:
   downloading, by at least one of the plurality of payors, a payor application for use on a computing device of the at least one of the plurality of payors; and
   downloading, by at least one of the plurality of billers, a biller application for use on a computing device of the at least one of the plurality of billers.

6. The method of claim 5, wherein at least one of the payor application and biller application is configured to provide secure access to the by-item bill payment program.

7. The method of claim 4, wherein enrolling the plurality of billers and the plurality of payors in the by-item bill payment program comprises assigning a unique account number to each of at least a subset of the plurality of billers and at least a subset of the plurality of payors, respectively.

8. The method of claim 1, wherein the first payment terms comprises pay now payment terms, and the second payment terms comprises installment payment terms.

9. The method of claim 1, wherein said enrolling of said plurality of billers comprises populating a database, accessible to a database management system of said by-item bill payment platform network executing on said at least one hardware processor, with a data structure including predefined payment terms corresponding to different item numbers to appear on invoices from said plurality of billers, including said invoice obtained from the given one of said billers.

10. The method of claim 1, wherein said enrolling of said plurality of billers comprises populating a database, accessible to a database management system of said by-item bill payment platform network executing on said at least one hardware processor, with a data structure including codes to appear on invoices from said plurality of billers, including said invoice obtained from the given one of said billers, and predefined payment terms corresponding to said codes.

11. The method of claim 1, wherein the first transaction is handled in accordance with pay now payment terms and the second transaction is handled in accordance with installment payment terms, the method further comprising sending at least one subsequent invoice to the first payor for at least a portion of a remaining balance due in connection with the second one of the charges in accordance with an installment schedule prescribed in the second payment terms.

12. The method of claim 11, further comprising sending a confirmation of payment to said first payor in response to obtaining payment from said first payor for said at least one subsequent invoice.

13. An apparatus, comprising:
   a memory;
   at least one processor operatively coupled to said memory; and
   a persistent storage device operatively coupled to said memory and storing in a non-transitory manner instructions which, when loaded into said memory, cause said at least one processor to be configured:
      to implement a by-item bill payment platform network and a bill presentment and payment system platform module coupled to a payment network connecting a plurality of billers to at least a first payor, said by-item bill payment network further comprising an enrollment user interface module, a business logic module, a database management system module, and a by-item bill payment network platform-bill presentment and payment system interface module;

to enroll a plurality of billers in a by-item bill payment program by executing said enrollment user interface module to access said database management system module;

to obtain an invoice from a given one of said billers by executing said bill presentment and payment system platform module, said bill presentment and payment system platform module being in data communication with said bill presentment and payment system interface of said by-item bill payment platform network, the invoice including multiple charges corresponding to at least one of goods and services purchased from the given one of said billers by said first payor;

to modify the invoice obtained from the given one of said billers, based at least in part on said enrolling step, to generate at least one modified invoice in response to a determination by said business logic module of said by-item bill payment platform network, said at least one modified invoice including multiple charges corresponding to said at least one of goods and services purchased from the given one of said billers by said first payor, at least a first one of the charges being handled under first payment terms and at least a second one of the charges being handled under second payment terms, the first and second payment terms being different relative to one another;

to send said at least one modified invoice to said first payor by executing said bill presentment and payment system platform module;

to obtain payment from said first payor by executing said bill presentment and payment system platform module; and to allocate a first portion of the obtained payment towards said first one of the charges and to allocate towards said second one of the charges by executing said bill presentment and payment system platform module.

14. The apparatus of claim 13, wherein said at least one processor is operative to send a confirmation of payment to said first payor in response to obtaining payment from said first payor.

15. The apparatus of claim 13, wherein said at least one processor is further operative to enroll a plurality of payors, including said first payor, in said by-item bill payment program by executing said enrollment user interface module to access said database management system module, wherein in enrolling the plurality of billers and the plurality of payors in said by-item bill payment program, said at least one processor is operative to obtain prescribed identifying information from the plurality of billers and the plurality of payors, and wherein said payment network connecting said plurality of billers to said plurality of payors.

16. The apparatus of claim 13, further comprising a persistently-stored database populated by said database management system module during said enrolling of said plurality of billers, said persistently-stored database being accessible to said by-item bill payment platform network, said persistently-stored database being populated with a data structure including predefined payment terms corresponding to different item numbers to appear on invoices from said plurality of billers, including said invoice obtained from the given one of said billers.

17. The apparatus of claim 13, further comprising a persistently-stored database populated by said database management system module during said enrolling of said plurality of billers, said persistently-stored database being accessible to said by-item bill payment platform network, said persistently-stored database being populated with a data structure including codes to appear on invoices from said plurality of billers, including said invoice obtained from the given one of said billers, and predefined payment terms corresponding to said codes.

18. The apparatus of claim 13, wherein the first transaction is handled in accordance with pay now payment terms and the second transaction is handled in accordance with installment payment terms, and wherein said at least one processor is operative to send at least one subsequent invoice to the first payor for at least a portion of a remaining balance due in connection with the second one of the charges in accordance with an installment schedule prescribed in the second payment terms.

19. The apparatus of claim 18, wherein said at least one processor is operative to send a confirmation of payment to said first payor in response to obtaining payment from said first payor for said at least one subsequent invoice.

20. An article of manufacture comprising a non-transitory computer-readable storage medium storing instructions which, when executed by a processor, causes said processor to be operative:

to implement a by-item bill payment platform network and a bill presentment and payment system platform module coupled to a payment network connecting a plurality of billers to at least a first payor, said by-item bill payment network further comprising an enrollment user interface module, a business logic module, a database management system module, and a by-item bill payment network platform-bill presentment and payment system interface module;

to enroll a plurality of billers in said by-item bill payment program by executing said enrollment user interface module to access said database management system module;

to obtain an invoice from a given one of said billers by executing said bill presentment and payment system platform module, said bill presentment and payment system platform module being in data communication with said bill presentment and payment system interface of said by-item bill payment platform network, the invoice including multiple charges corresponding to at least one of goods and services purchased from the given one of said billers by said first payor;

to modify the invoice obtained from the given one of said billers, based at least in part on said enrolling step, to generate at least one modified invoice in response to a determination by said business logic module of said by-item bill payment platform network, said at least one modified invoice including multiple charges corresponding to at least one of goods and services purchased from the given one of said billers by said first payor, at least a first one of the charges being handled under first payment terms and at least a second one of the charges being handled under second payment terms, the first and second payment terms being different relative to one another;

to send said at least one modified invoice to said first payor by executing said bill presentment and payment system platform module;

to obtain payment from said first payor by executing said bill presentment and payment system platform module; and to allocate a first portion of the obtained payment towards said first one of the charges and to allocate towards said second one of the charges by executing said bill presentment and payment system platform module.

21. An apparatus, comprising:

means for implementing a by-item bill payment network and a bill presentment and payment system platform module coupled to a payment network connecting a plurality of billers to at least a first payor, said by-item bill payment network further comprising an enrollment user interface module, a business logic module, a database management system module, and a by-item bill payment network platform-bill presentment and payment system interface module;

means for enrolling a plurality of billers in a by-item bill payment program, by executing said enrollment user interface module to access said database management system module;

means for obtaining an invoice from a given one of said billers via a bill presentment and payment system platform module executing on at least one hardware processor, said bill presentment and payment system platform module being in data communication with said by-item bill payment platform network via said by-item bill payment network platform-bill presentment and payment system interface module, the invoice including multiple charges corresponding to at least one of goods and services purchased from the given one of said billers by first payor;

means for modifying the invoice obtained from the given one of said billers, based at least in part on said enrolling step, via said business logic module of said by-item bill payment platform network executing on said at least one hardware processor, to generate at least one modified invoice including multiple charges corresponding to said at least one of goods and services purchased from the given one of said billers by said first payor, at least a first one of the charges being handled under first payment terms and at least a second one of the charges being handled under second payment terms, the first and second payment terms being different relative to one another;

means for sending said at least one modified invoice to said first payor, via said bill presentment and payment system platform module executing on said at least one hardware processor;

means for obtaining payment from said first payor, via said bill presentment and payment system platform module executing on said at least one hardware processor; and means for allocating a first portion of the obtained payment towards said first one of the charges and allocating a second portion of the obtained payment to said second one of the charges, via said bill presentment and payment system platform module executing on said at least one hardware processor.

\* \* \* \* \*